(12) United States Patent
Hill et al.

(10) Patent No.: US 10,087,743 B2
(45) Date of Patent: Oct. 2, 2018

(54) FLUID LEVEL DETERMINATION APPARATUS AND METHOD OF DETERMINING A FLUID LEVEL IN A HYDROCARBON WELL

(71) Applicant: Reservoir Management Services, LLC, Bakersfield, CA (US)

(72) Inventors: David R Hill, Trinidad, CO (US); Dennis Duncan Earl, San Diego, CA (US)

(73) Assignee: RESERVOIR MANAGEMENT SERVICES, LLC, Bakersfield, CA (US)

( * ) Notice: Subject to any disclaimer, the term of this patent is extended or adjusted under 35 U.S.C. 154(b) by 240 days.

(21) Appl. No.: 15/201,579

(22) Filed: Jul. 4, 2016

(65) Prior Publication Data

US 2016/0312601 A1    Oct. 27, 2016

Related U.S. Application Data

(63) Continuation-in-part of application No. 13/838,490, filed on Mar. 15, 2013.

(51) Int. Cl.
*E21B 47/047* (2012.01)
*E21B 33/068* (2006.01)
(Continued)

(52) U.S. Cl.
CPC .......... *E21B 47/042* (2013.01); *E21B 33/068* (2013.01); *E21B 43/128* (2013.01); *E21B 43/121* (2013.01); *G01F 23/18* (2013.01)

(58) Field of Classification Search
CPC .............................. E21B 47/04; E21B 47/042
See application file for complete search history.

(56) References Cited

U.S. PATENT DOCUMENTS 2,283,477 A  *  5/1942  Walker .................. E21B 47/042
                                              73/152.61
3,965,983 A  *  6/1976  Watson ............... E21B 47/0008
                                              166/250.15

(Continued)

OTHER PUBLICATIONS

PCB Piezotronics, "Model 106B52 ICP Pressure Sensor Installation and Operating Manual", published by PCB Piezotronics, Inc. Aug. 24, 2010 (Year: 2010).*

*Primary Examiner* — Blake E Michener
(74) *Attorney, Agent, or Firm* — James M. Duncan, Esq.; Klein DeNatale Goldner

(57) ABSTRACT

A system makes real time fluid level determinations based upon shock waves detected by a pressure sensor which is able to detect very small changes in the amplitude of the received signal. Because the various components of the artificial lift system can have significant mechanical vibrations and noise, the pressure sensor utilized in the present invention may be high-sensitivity pressure sensor which is vibration-compensated with an electrical amplifier integrated directly into the sensor body to amplify the observed shock wave. The sensor has compensation components which ascertain low-frequency lateral motion and other noise, distinguishing the low frequency wave forms from the incoming reflections from the shock waves. The observed lateral motion is subtracted from the pressure sensor signal in determining the depth to the fluid.

1 Claim, 19 Drawing Sheets

(51) Int. Cl.
*E21B 43/12* (2006.01)
*E21B 47/04* (2012.01)
*G01F 23/18* (2006.01)

(56) References Cited

U.S. PATENT DOCUMENTS

| | | | | |
|---|---|---|---|---|
| 4,509,552 A | * | 4/1985 | Eicher | E21B 47/042 |
| | | | | 137/557 |
| 5,715,890 A | * | 2/1998 | Nolen | E21B 47/042 |
| | | | | 166/250.03 |
| 5,754,495 A | * | 5/1998 | Skinner | G01S 15/88 |
| | | | | 367/99 |
| 6,085,836 A | | 7/2000 | Burris et al. | |
| 6,237,410 B1 | * | 5/2001 | Dyck | E21B 47/042 |
| | | | | 367/118 |
| 8,281,853 B1 | | 10/2012 | Hill et al. | |
| 9,127,536 B2 | | 9/2015 | Hill | |
| 9,933,293 B2 | * | 4/2018 | Earl | G01F 23/296 |
| 2002/0096323 A1 | * | 7/2002 | Burris | E21B 47/0007 |
| | | | | 166/250.03 |
| 2006/0131028 A1 | | 6/2006 | Burris et al. | |
| 2006/0133635 A1 | * | 6/2006 | Hill | G01F 23/296 |
| | | | | 381/369 |
| 2010/0000730 A1 | * | 1/2010 | Jennings | E21B 47/04 |
| | | | | 166/255.2 |
| 2010/0314097 A1 | * | 12/2010 | Jennings | E21B 47/04 |
| | | | | 166/65.1 |
| 2011/0228637 A1 | * | 9/2011 | Zamow | E21B 47/042 |
| | | | | 367/35 |
| 2012/0084055 A1 | * | 4/2012 | Smithson | E21B 47/042 |
| | | | | 702/166 |
| 2012/0325456 A1 | * | 12/2012 | Hill | E21B 43/127 |
| | | | | 166/53 |
| 2015/0142319 A1 | | 5/2015 | McCoy | |
| 2017/0059388 A1 | * | 3/2017 | Earl | G01F 23/296 |

\* cited by examiner

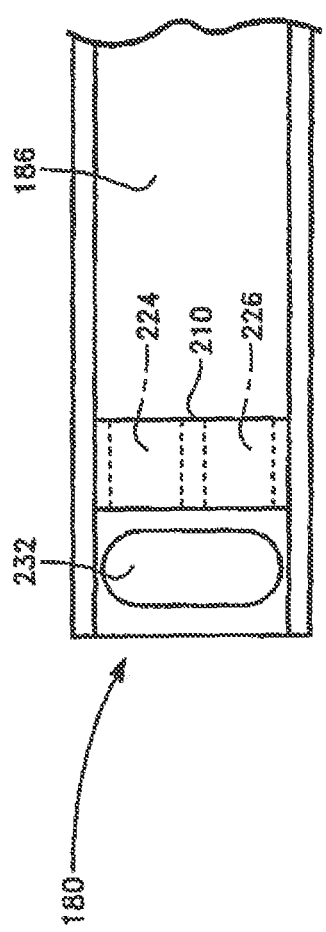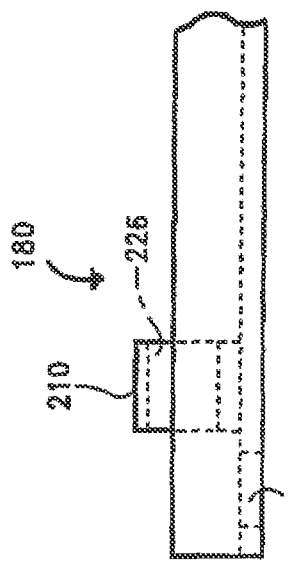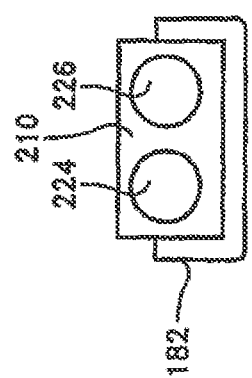

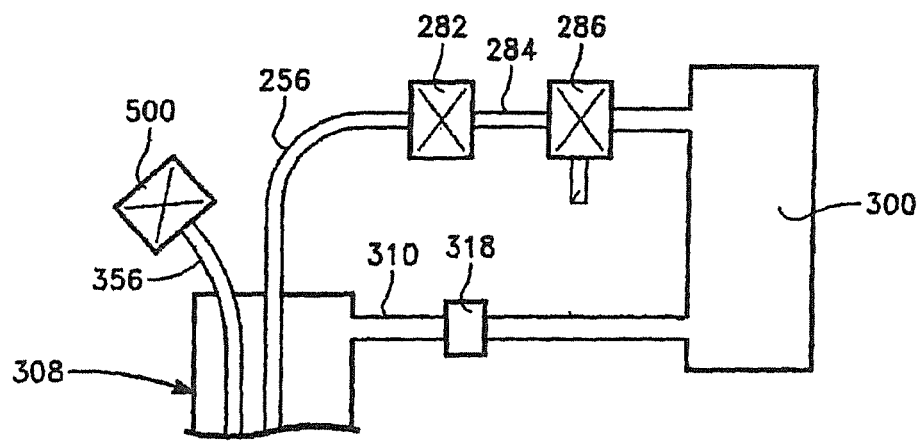
*Figure 9*
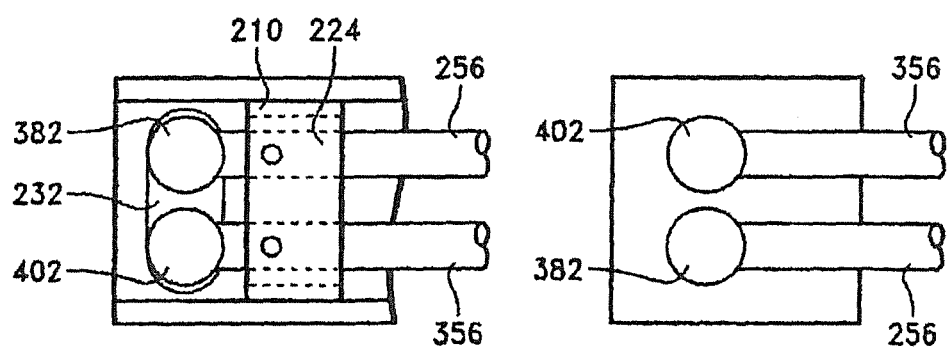
*Figure 10*  *Figure 11*

FLUID LEVEL DETERMINATION APPARATUS AND METHOD OF DETERMINING A FLUID LEVEL IN A HYDROCARBON WELL

RELATED APPLICATIONS

This is a continuation-in-part application of U.S. patent Ser. No. 13/838,490 filed on Mar. 15, 2013, to which the inventors herein claim domestic priority.

BACKGROUND OF THE INVENTION

1. Field of the Invention

The present invention relates to the determination of the fluid level in the tubing-casing annulus of an oil well, gas well, or water well on a real time basis utilizing equipment which may be located at or near the ground surface. The present invention provides for the rapid, accurate, and relatively easy determination of the fluid level in the tubing-casing annulus through the imposition of a pressure wave—specifically a shock wave in contrast to the known systems which utilize acoustic waves. Embodiments of the present invention may also provide a history of the fluid levels and performance history of the artificial lift equipment. The present invention further provides the necessary input for a motor control means, such as motor starter or variable frequency controller connected to an electrical motor operating an artificial lift system or pumping system, to achieve and maintain the optimal production rate for an oil well or the injection rate of a water injection well. The integration of a real-time fluid level detection device together with a motor control means, such as a variable frequency controller, allows the optimization of well bore inflow with the well outflow provided by the artificial lift system, such that the outflow provided by the artificial lift equipment efficiently corresponds to the inflow of the reservoir.

2. Description of Practices in the Art

It is known that fluids are replenished into a particular well bore at different rates even in the same formation or well field. Such replenishment is impacted by, among other things, the section (i.e., length) of reservoir exposed to perforations or slots, any formation damage adjacent to the well bore, and/or the extent of reservoir heterogeneities adjacent to the well bore. Moreover, fluid replenishment into a particular well bore may change over time as a result of changes in reservoir properties resulting from cumulative production, stimulation or reservoir management practices, such as pressure maintenance. When a fluid reservoir is initially produced, there may be sufficient reservoir energy to produce the fluids to the ground surface, i.e., the pressure of the fluid reservoir is greater than the hydrostatic pressure exerted by a fluid column which extends from the ground surface to the depth of the reservoir. However, particularly in the case of solution gas drive reservoirs, the reservoir energy usually decreases as the reservoir is depleted to where the reservoir pressure is eventually less than the hydrostatic pressure exerted by a column produced fluid within the well bore.

When the reservoir energy is not sufficient for the reservoir fluids to flow to the surface some form of artificial lift system is required. Such artificial lift systems typically utilize some type of subsurface pump which is installed at the approximate depth of the producing reservoir. These artificial lift systems include positive displacement pumps, centrifugal pumps, jet pumps, piston pumps, and progressive cavity pumps.

One commonly known artificial lift system utilizes a plurality of rods connected in an end-to-end configuration forming a "rod string." The rod string is set inside a plurality of tubing joints which are likewise connected in an end-to-end configuration forming the "tubing string," with the reservoir fluids primarily produced up the tubing string in the annulus between the rod string and the tubing string. The rod string is utilized to operate a pump set at the bottom of the tubing string. The most commonly used subsurface pump is a positive displacement pump having a plunger which reciprocates up and down within a barrel, where the plunger is connected to the rod string and the rod string is reciprocated by a pumping unit set at the ground surface. Another type of subsurface pump, a progressive cavity pump, has a rotor which is rotated within a stator by the rod string, where the rod string is rotated at the ground surface by an electrical motor coupled to a gear reducer. Electric submersible pumps are also used, where the motor is located downhole and typically coupled directly to a centrifugal pump. In piston pump installations, a surface pump injects a power fluid into the well which operates a down hole piston pump. In jet pump operations, a surface pump injects a power fluid which flows through a downhole venturi to create the required lift to produce the reservoir fluids.

The starting and stopping of each of the above-described pump systems may be controlled by a signal provided to the motor starter of each prime mover operating the downhole pump, such that the pump capacity is simply adjusted by controlling the run time of the downhole pump, which is done with systems which run on timers. Another means of adjusting the capacities of each of these artificial lift systems is by adjusting the pump speed by adjusting the speed of the motor operating the pump. Controlling the motor speed may be accomplished by utilizing a variable frequency drive.

With each subsurface pumping system, a dynamic equilibrium is reached where the inflow rate of the reservoir fluids and the outflow rate of the fluids generated by the artificial lift system are essentially equivalent (excepting free gas which is not produced by the subsurface pumping system but rather produced as a separate phase, typically through the casing-tubing annulus). However, the inflow rate from the reservoir into the well bore will be impacted by any backpressure maintained on the reservoir inside the wellbore. Such backpressure results from any fluid column in the wellbore above the producing zone, in combination with any pressure applied at the surface at the casing-tubing annulus, such as any pressure imposed by a gas collection system.

Ideally, the backpressure applied at the surface and the fluid level within the tubing-casing annulus are each maintained at minimal levels, which maximizes the pressure differential from the reservoir into the well bore. Maximizing this pressure differential, in turn, maximizes fluid flow or inflow into the well bore. However, achieving this maximum inflow requires a corresponding matching outflow produced by the artificial lift system to reach a dynamic equilibrium. In other words, to achieve maximum production from a well, the well outflow rate generated by the artificial lift system must match the maximum inflow rate produced from the reservoir to minimize the backpressure exerted by any fluid column standing within the well bore above the producing zone.

The preceding discussion suggests that to maximize production, the subsurface pump should be run so as to keep the level in the well bore as low as possible. However, this option may be less than ideal because if the outflow produced by the artificial lift equipment exceeds the inflow, i.e, the pumping rate of the artificial lift equipment exceeds the rate of flow into the wellbore from the reservoir, several negative results may occur. First, running the pump constantly or at too great a speed may be inefficient because, at times, the well may be "pumped off" leaving little fluid in the well bore to be pumped, resulting in wasted energy. Second, running pumping equipment when a well is in a pumped off condition can damage the equipment, resulting in costly repairs. Third, paraffin build up is more pronounced when a well is allowed to pump dry. In a pumped off condition gases are drawn into the well bore, which expand and cool. As the gases cool, paraffin build up is promoted as the hydrocarbons begin to plate out on the surfaces of the well bore.

Achieving equilibrium between inflow and outflow is further complicated by changing conditions within the reservoir, which result in changes in inflow performance. Such changes may result from, among other things, the initiation or suspension of a reservoir pressure maintenance program utilizing either gas or water injection, stimulating the well to remove reservoir damage near the well bore, or stimulating injection wells to increase injection rates. The reservoir conditions may also be impacted by the addition of new wells producing from the reservoir or changing production rates in existing wells which produce from the same reservoir. Thus, matching inflow performance of the reservoir with the outflow of the artificial lift system can present a moving target and an artificial lift system which maintains a constant outflow is not a preferred solution for a well subject to changes in its inflow performance.

A variety of methods are known for adjusting the outflow performance of an artificial lift system in accord with the inflow performance. Systems which utilize reciprocating rod pumps may have adjustments made to the outflow performance by changing the speed of rod reciprocation, changing the length of the pump stroke, or changing the diameter of the subsurface pump. Changing pumping speed and pump stroke for rod pumped wells usually can be accomplished by making adjustments in surface equipment, however changing the pump diameter requires pulling the rod string, pump, and often the tubing string. Changing the speed of rod reciprocation can be done by causing the surface pumping unit to run faster by either changing the sheave size between the prime mover and gear box, or by changing the operational speed of the pumping unit motor. Changing the sheave size requires the shutting down of the pumping unit and can be an involved process requiring a construction crew Likewise, stroke adjustments may be made at the surface so long as the subsurface pump has sufficient length to accommodate any increases in stroke length. Stroke length changes also normally require the services of a construction crew and the shutting down of the pumping unit.

Changing the operational speed of the motor may be accomplished through the use of a variable speed drive unit, or variable frequency drive ("VFD"). If a VFD is combined with a processing unit, various input parameters, including observed fluid levels, may be utilized to arrive at a pumping speed, and thus a particular outflow capacity, which is in dynamic equilibrium with the reservoir inflow performance. Such systems may be used not only with reciprocating rod pumps, but also with rod-operated progressive cavity pumps, downhole submersible pumps and other pumps which are operated by electric motors.

U.S. Pat. No. 6,085,836, invented by, among others, D. R. Hill, one of the present inventors, proposed an initial solution to the problem of reaching dynamic equilibrium between reservoir inflow performance and the outflow performance of the artificial lift equipment. The '836 patent is incorporated herein by reference. The '836 patent discloses a method of determining the well fluid level for purposes of adjusting the subsurface pumping time, including controlling pumping time with timers. It is known to use timers to control the pump duty cycle. A timer may be programmed to run the well nearly perfectly if one could determine the duration of the on cycle and off cycle which maintains a dynamic equilibrium between the inflow to the well bore and the outflow generated by the artificial lift equipment.

If real time fluid level information can be obtained, deciding when or how fast to run the pump is relatively straightforward and production can be optimized. Real time fluid level determinations, particularly for deep well systems, have been realized by the implementation of downhole instrumentation such as load cells, transducers or similar devices which acquire downhole pressures (thus fluid levels) and transmit the information to the surface via various means. Unfortunately, these real time downhole systems may be costly and complex to install, unreliable in operation, and costly to repair or service, typically requiring the removal of the rods and production tubing with a production rig or work-over unit. Although the implementation details will not be discussed here, it is worth noting that these systems, when operating correctly, have proven that significant gains in well production are available when control strategies applying real time fluid level measurement are utilized.

As an alternative to systems which measure downhole pressure with downhole devices, are those systems which utilize acoustic energy to ascertain the depth of the fluid level by generating an acoustic wave at the surface and detecting the return signal to calculate the depth to fluid. One such system uses a one-shot measurement. The one-shot measurement will use a sonic event, such as firing a shotgun shell, to generate the acoustic signal. Another system utilizes charges from a nitrogen tank to generate sonic events. However, in either of the foregoing systems the production of the well must usually be shut down before initiating the sonic event and monitoring the corresponding return signals.

As an alternative to the one-shot measurement systems are those which are programmed to provide periodic acoustic signals, and which do so while the surface equipment is in operation. Such a system is described in U.S. Pat. No. 8,281,853, of which an inventor of the present invention, D. R. Hill, is an inventor. The system of the '853 patent may utilize produced gas from the well to generate the acoustic signal. These systems have provided a good solution for optimizing well production by real time adjustment of the well outflow in accord with changes in flow into the wellbore.

Improved accuracy in the fluid level measurement provides great advantage in matching the outflow of the artificial lift equipment with the reservoir inflow. Moreover, greater accuracy in a series of fluid level determinations combined with other monitored production parameters, such as real time production rates, flowing pressures and temperatures, etc., allows greater accuracy in determining other operational parameters such as determination of real time fluid densities, or ascertaining with greater accuracy the real time impact on one well as a result of changes in the production/injection rates of adjacent wells. Such information may be utilized efficient reservoir management, where the production rates and injection rates in a particular reservoir may be optimized according to the observed parameters by utilizing motor controllers, such as variable frequency drives on artificial lift equipment and injection pumps. However, one obstacle to obtaining accurate readings is the presence of noise in the well caused by the mechanical operation of the well equipment and by the various noises produced by the flow of fluids, and sometimes sand, into the wellbore.

SUMMARY OF THE INVENTION

The present invention does not require downhole instrumentation for making a series of precise operational fluid levels, and thus does not present the complexities in installation and maintenance presented by such systems. With respect to the known systems which utilize acoustic waves at the surface, the present invention utilizes shock waves for the fluid level determination. The use of shock waves combined with the disclosed pressure sensor and signal processing logic provide a much more favorable signal-to-noise ratio, thereby allowing for accurate fluid level determinations even with significant operational noise from the well. The use of shock waves permits continuous operation of the well as the shock waves are generated, the data collected, the well conditions ascertained, and the changes in outflow implemented, typically by changing the speed of the motor operating the pump.

A shock wave is a strong pressure wave in an elastic medium such as air, water, or a solid substance, produced by a variety of means, including supersonic aircraft, explosions, lightning, or other phenomena that create violent changes in pressure. Shock waves are different from sound waves. With shock waves, compression takes place in the wave front. The wave front is a region of sudden and violent change in stress, density, and temperature, such that the propagation of shock waves is different from that of acoustic waves. In particular, shock waves travel faster than sound, and their speed increases as the amplitude is raised. However, the intensity of a shock wave also decreases faster than does that of a sound wave, because some of the energy of the shock wave is expended to heat the medium in which it travels. The amplitude of a strong shock wave, as created in air by an explosion, decreases almost as the inverse square of the distance until the wave has become so weak that it obeys the laws of acoustic waves. The waves protruding from a shock wave are confined to a cone that narrows as the speed of the source increases and the waves bunch up, creating high-pressure regions outside the compressed waves. The border from inside to outside of the cone is the shock wave. The strength of a shock wave dissipates greatly with distance, much more so than a regular wave, as heat and other energy are more quickly transferred into the surrounding environment. Once enough energy has dissipated, the shock wave will become a regular wave such as a sound wave.

The system of the present invention may utilize produced fluids from the well to generate the shock waves, thus avoiding the need to replenish the material and the cost such material which are otherwise utilized, such as nitrogen or gunpowder. The present invention does not require opening of the well to the atmosphere as typically required for surface deployed units. The real time fluid level determinations provided by embodiments of the present invention in combination with the variable frequency control of the motor operating the subsurface pump provides a production system which accomplishes the optimal production rate, where the reservoir inflow may be balanced with the artificial lift outflow with the fluid level maintained at a level which provides maximum draw down into the wellbore.

The real time fluid level detection means of the present invention places the shock wave generating device and the shock wave detection apparatus directly within the tubing-casing annulus rather than made up onto a pipe fitting as done by most devices. In one embodiment of the device, the shock wave generating device comprises a pressure transducer is in fluid communication with a compressor. These two components are configured such that, when used in combination with a valve, a charge of compressed gas is discharged into the tubing-casing annulus through a gas emitting tubing to emit the shock wave.

The real time fluid level detection means also has a receiving tube which provides fluid communication between the tubing-casing annulus and a shock wave measurement device, where the shock wave measurement device has means for ascertaining a return signal from the shock wave generated by the charge of compressed gas, wherein the return signal enables a processor to determine the well fluid level. The return shock wave signal is detected and measured with a piezoelectric pressure sensor which is able detect very small changes in the amplitude of the received signal. Because the various components of the artificial lift system can have significant mechanical vibrations and noise, the pressure sensor utilized in the present invention may be high-sensitivity pressure sensor which is vibration-compensated with an electrical amplifier integrated directly into the sensor body to amplify the observed shock wave. An acceptable sensor may include compensation components which ascertain low-frequency lateral motion and distinguish it from the incoming pressure waves. The observed lateral motion is subtracted from the pressure sensor signal in determining the depth to the fluid.

The real time fluid level detection means may be automatically and periodically activated to provide a nearly continuous determination of the fluid level in the tubing-casing annulus, thus providing a real time indication of reservoir inflow.

Used in combination with the real time fluid level detection means, an artificial lift system has an outflow capacity which may be adjusted in accord with the observed real time fluid level measurements, which allows the inflow and outflow performance of the well to be optimized for producing the well at a flow rate which is efficient, reduces wear in the artificial lift system, and which may be coordinated on a field wide basis with other artificial lift units for effective reservoir management. The adjustment is achieved by utilizing a variable frequency drive unit with the electrical motor which operates the subsurface pump. The variable frequency drive unit has a user interface which allows for adjusting set points for depth to fluid level, or which allows for changing the production rate with a manual control.

The user interface further provides various reservoir management tools, such as historical analysis of fluid levels, production rates, and surface pressures for both the tubing and casing. When employed on a field wide basis, the data may be utilized to ascertain, among other things, the effectiveness of well stimulation programs, pressure maintenance activities, and well spacing practices. When analyzed together with well maintenance records, the information may also be utilized for analyzing preventative maintenance, scheduling pump changes, and well diagnostics.

The present system allows for obtaining a record of the signal-to-noise ratio which may be utilized for diagnostic purposes, such as detecting changes in mechanical condition of the well.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 schematically shows a plan view of a portion of a tube carrying tray which may be utilized in embodiments of the invention.

FIG. 6 shows an end view of the tray assembly of FIG. 5.

FIG. 7 shows a side view of the portion of the tray assembly shown in FIG. 5.

FIG. 9 schematically shows the shock wave generation and detection apparatus.

FIG. 10 schematically shows a bottom view of an embodiment of the end of an optional tray assembly, showing the terminating ends of the shock wave emission tubing and signal receiving tubing which are disposed within the casing-tubing annulus of a well.

FIG. 11 schematically shows a top view of the end of the tray assembly depicted in FIG. 10.

DETAILED DESCRIPTION OF THE INVENTION

In one embodiment, the fluid level determination mechanism utilizes produced gas to generate an energy pulse, i.e., a shock wave, an a pressure sensor for detecting a return signal. Utilizing the elapsed time between the initial pulse and the detection of the return signal, a processor calculates the fluid level in the tubing-casing annulus 276. This cycle may be repeated as desired, up to three times per minute, to monitor the relationship between the reservoir inflow and the outflow produced by the artificial lift equipment or, without operating the artificial lift equipment, perform various diagnostic tests including interference testing or to conduct pressure build-up tests. In addition, the dynamic fluid level data may be provided to a digital network for monitoring or managing the hydrocarbon reservoir.

Figure 1A:
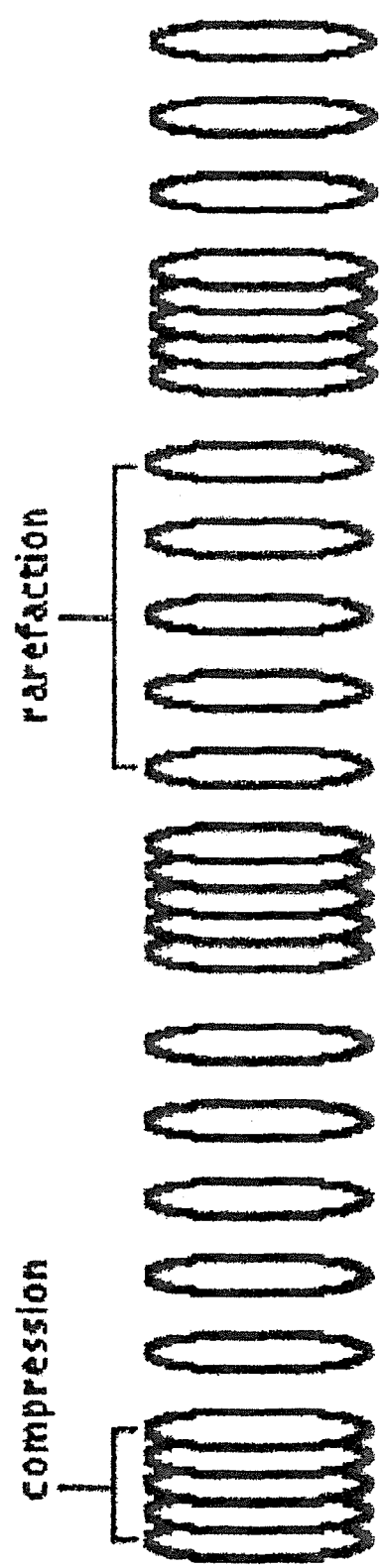
FIG. 1A shows an acoustic wave form.
Figure 1B:
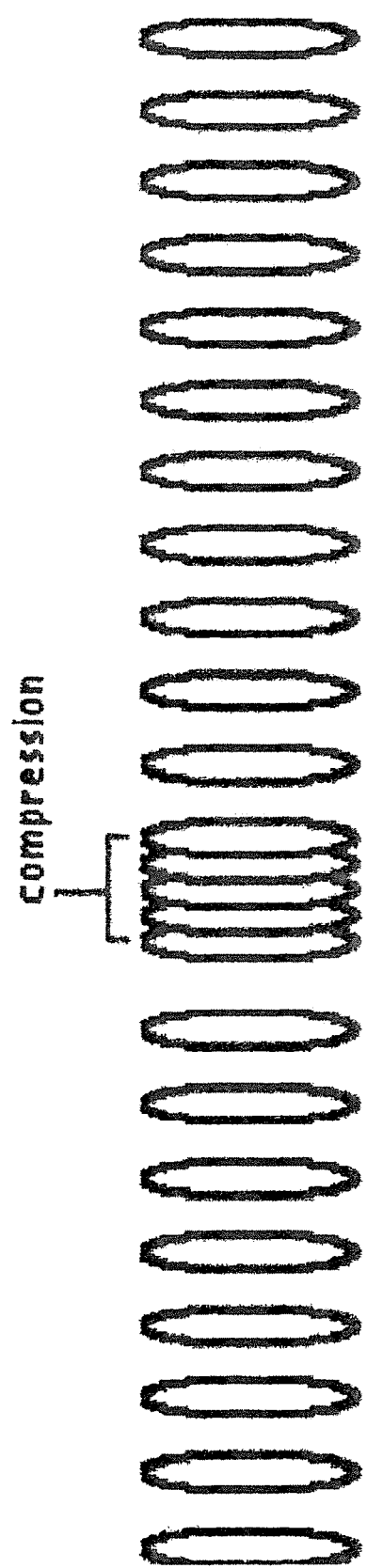
FIG. 1B shows a shock wave form.

The use of a shockwave, as opposed to an acoustic wave, has two important advantages. The first advantage is that, unlike an acoustic wave, the shockwave consists of only a compressed region of gas, as illustrated in FIGS. 1a and 1b. This compressed region of gas is not followed by a rarefied region of gas, as is the case with acoustic waves. This distinction means that the sensor detecting the reflected shockwave must only accommodate a high-speed compressive force. In contrast to the current systems, the sensor does not need to recover quickly to then detect a high speed contracting force, as required when the detected signal is an acoustic wave. Consequently, the sensor's frequency response can be significantly lower than acoustic frequencies while still reliably detecting the shockwave. Having a pressure sensor with a frequency response specifically tailored to shockwaves, as opposed to acoustic waves, allows the acoustic noise in the well to be more fully eliminated from the acquired pressure signal.

Regarding the second advantage, shockwaves exhibit a transmission speed that is greater than the speed of sound experienced by an acoustic wave. As a result, these supersonic pressure waves experience less signal degradation per meter (or less dispersion) as they propagate down the well until a depth is reached at which the amplitude of the shockwave is so attenuated that its transmission velocity approaches that of the speed of sound for an acoustic wave, beyond which point the speed of the shockwave will be the same as the speed of sound. However, the overall signal strength of the reflected pulse will be increased due to the supersonic portion of the transmission. Likewise, the amplitude of the reflected pressure pulse will be larger. Perhaps more importantly, the pulse width of the reflected pulse will remain quite narrow. In general, the pulse of the reflected wave will approximate the shock front of a shockwave and can be approximated mathematically by the Friedlander waveform.

The equation for a Friedlander waveform describes the pressure of a blast wave as a function of time, providing $P(t)=P_o e^{-1/t^*}(1-t/t^*)$ where $P_o$ is the peak pressure and $t^*$ is the time at which the pressure first crosses the horizontal axis (before the negative phase). This equation describes a shock wave pressure signature that incorporates not only the peak of the pressure signal, but also the "tail" of the signal. By using curve fitting algorithms to determine the best fit parameters of the Friedlander waveform, a highly resolved measurement of the shock front arrival time can be made. Unlike acoustic measurement techniques that utilize simple peak detection algorithms to identify signal spikes that mark the arrival time of an acoustic wavefront, the Friedlander equation allows many, many data points to be leveraged in determine the exact location of the returning shock wave front. This results in the measurement being much less susceptible to noise and, furthermore, enables sub-sampling resolution. For example, if a pressure sensor is used to detect a shock wave front and the sensor acquires 100 data points at one millisecond resolution, then using simple peak detection algorithms, the time resolution of that method is only 1 millisecond (or 0.17 m resolution). However, if all 100 data points are fit to a known curve, then the resolution with which the fit can determine the wave front's arrival time is significantly improved (typically by a factor of 10—i.e. 0.017 m). The curve fitting method is utilized in embodiments of the present invention use approximately 200 data points at a 1 millisecond sampling rate.

By tailoring the frequency response of the pressure sensor and filtering the return signal to only pulses resembling the Friedlander shockwave waveform, the differences between a shockwave and an acoustic wave can be greatly magnified and exploited to effectively segregate a reflected shockwave from a well's acoustic noise, which can be significant for an actively producing well with the artificial lift equipment in operation.

Shockwaves are best detected using differential sensors to measure changes in pressure rather than absolute pressures. These differential sensors allow only the shock front of a shockwave to be detected and effectively isolate the sensor from other slow-varying or static pressure changes. A piezoelectric differential pressure sensor that utilizes a special cut in the piezo crystal is specifically desired for use with shockwaves because they produce a proportionally higher output voltage compared to standard X-cut compression crystals (such as might be found in low-resolution pressure sensors or microphones). A pressure sensor with a detection resolution of $10^{-5}$ psi over a +1 psi range is typical with these types of sensors.

Figure 2A:
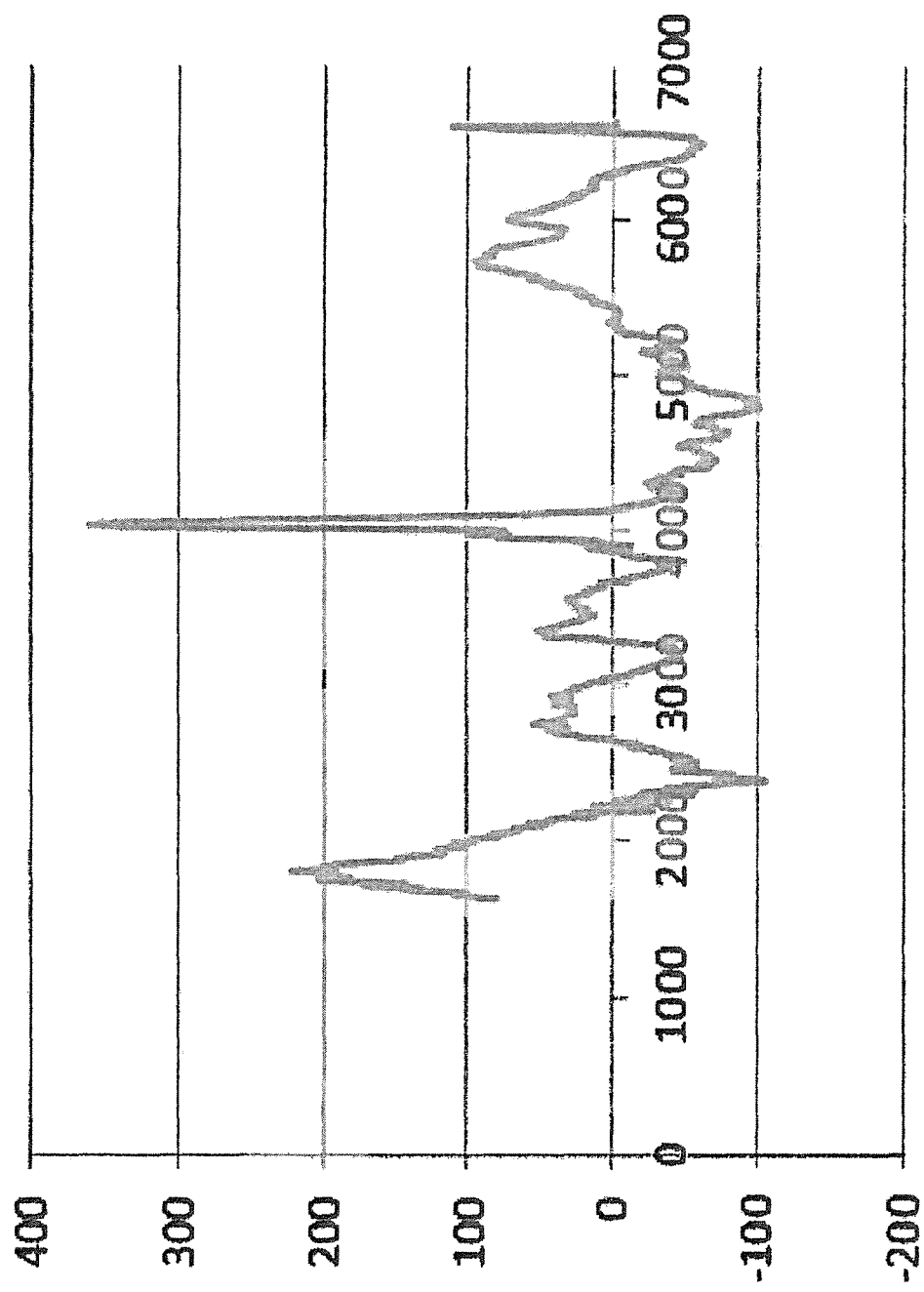
FIG. 2A shows a signal from a pressure sensor prior to being filtered for vibration and noise.
Figure 2B:
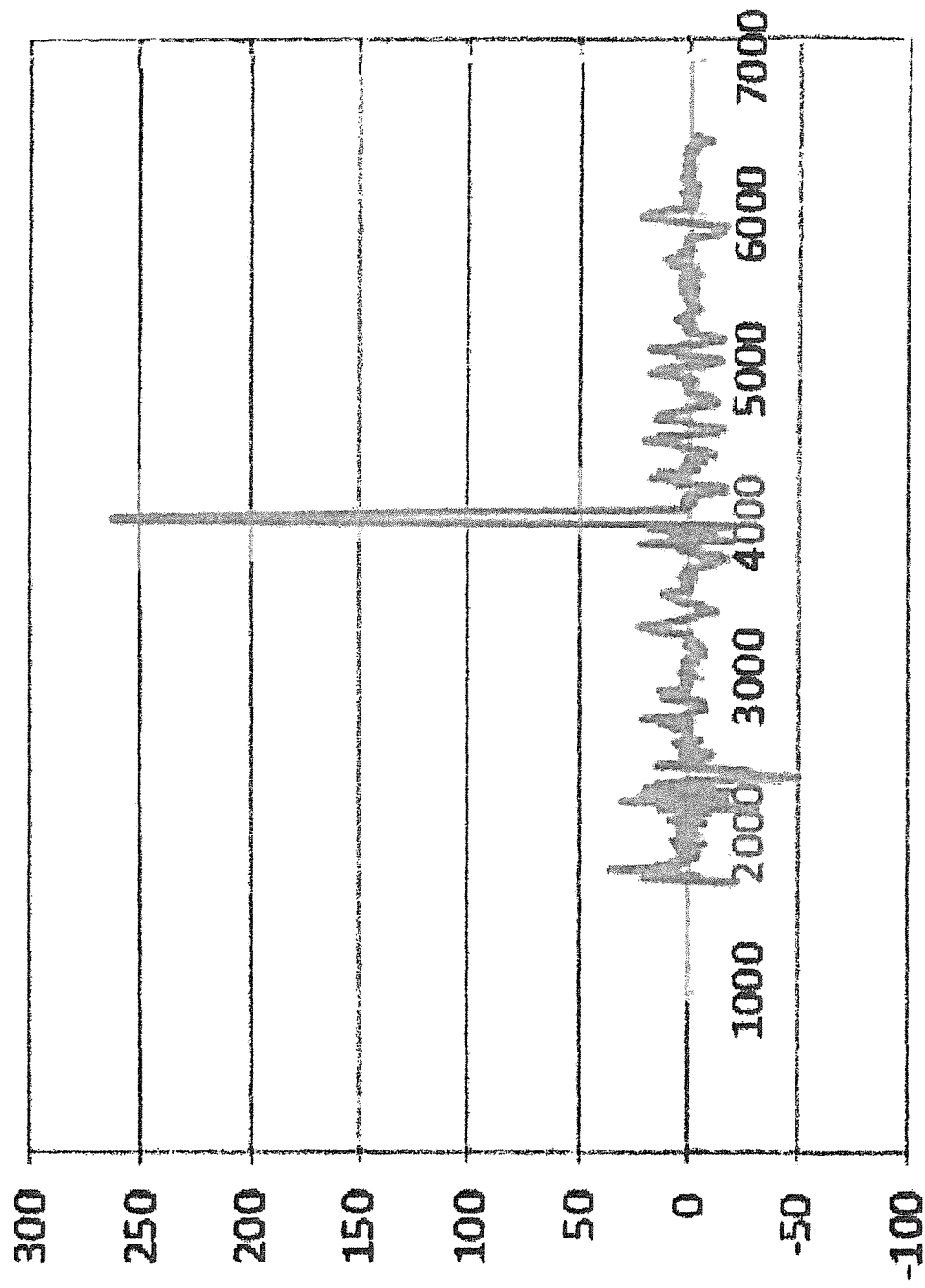
FIG. 2B shows a signal from a pressure sensor after being filtered for vibration and noise, showing the shock wave.

With the pressure waveform acquired from a differential piezo pressure sensor, the signal is digitally filtered to remove all peaks that do not conform to the characteristics of a shock front as illustrated by the comparison of FIGS. 2A and 2B. FIG. 2A depicts the acquired signal before being filtered for non-shockwave pressure waves and FIG. 2B depicts the signal after being filtered for non-shockwave pressure waves.

Figure 3:
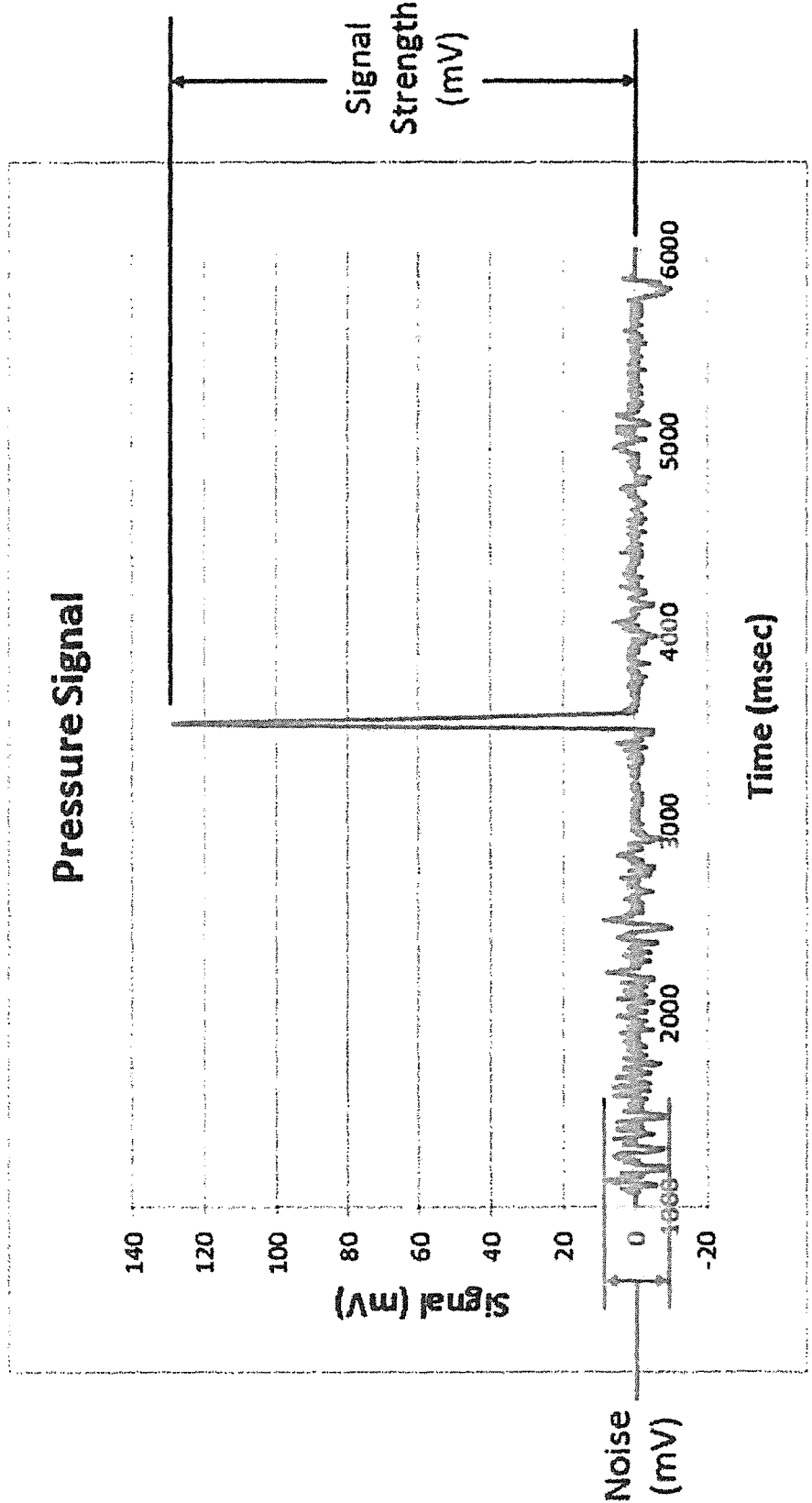
FIG. 3 graphically illustrates signal-to-noise ratio.

Once filtered, the only reflected peaks that will remain are true surface reflections. Some low level of noise will also be present in the signal that is characteristic of physical disturbances of the gas within the well (i.e. turbulence in the well fluid, surges of gas production from the well, etc.). The ratio of the peak signal to the standard deviation of the noise is defined as the signal-to-noise ratio ("SNR"). As illustrated in FIG. 3, when a peak has an SNR greater than ten, the peak is considered to be well-defined and its echo time can be reliably used to identify the location of the reflecting surface.

The SNR value measured during a fluid measurement can be a useful metric used for monitoring the health of a well. As a well becomes less efficient, a greater amount of mechanical energy is lost within the well and results in greater pressure disturbances as measured by the pressure sensor utilized with the invention. This phenomena is evidenced by a higher measured SNR over time. By measuring the change in SNR over time, the health of the well's mechanical condition can be monitored to provide an early warning of damage or an indicator that maintenance is required.

As illustrated in FIGS. 4-11, the fluid level determination mechanism of the present invention provides a gas emitting tubing 256 and a signal receiving tubing 356, the ends of which are directly disposed in the tubing-casing annulus 276 of a well with the openings in the ends in a downwardly facing orientation. As discussed below, the gas emitting tubing 256 and the signal receiving tubing 356 may be conveyed in a tray 180 which slides from a first position with the tubing ends, gas injection port 382 and pressure wave receiving port 402, on the outside of a block valve 320 to a second position with the gas injection port 382 and pressure wave receiving port 402 directly disposed in the tubing-casing annulus 276 in a down hole oriented position as discussed below. Alternatively, gas emitting tubing 256 and the signal receiving tubing 356 may be otherwise installed into the wellhead 258 such that the gas injection port 382 and pressure wave receiving port 402 are directly disposed in the tubing-casing annulus. Such installation may be configured through tubing sections which are placed into the annulus by extending through suitable packoff assemblies configured within a wellhead component, such as a tubing hanger.

Figure 4:
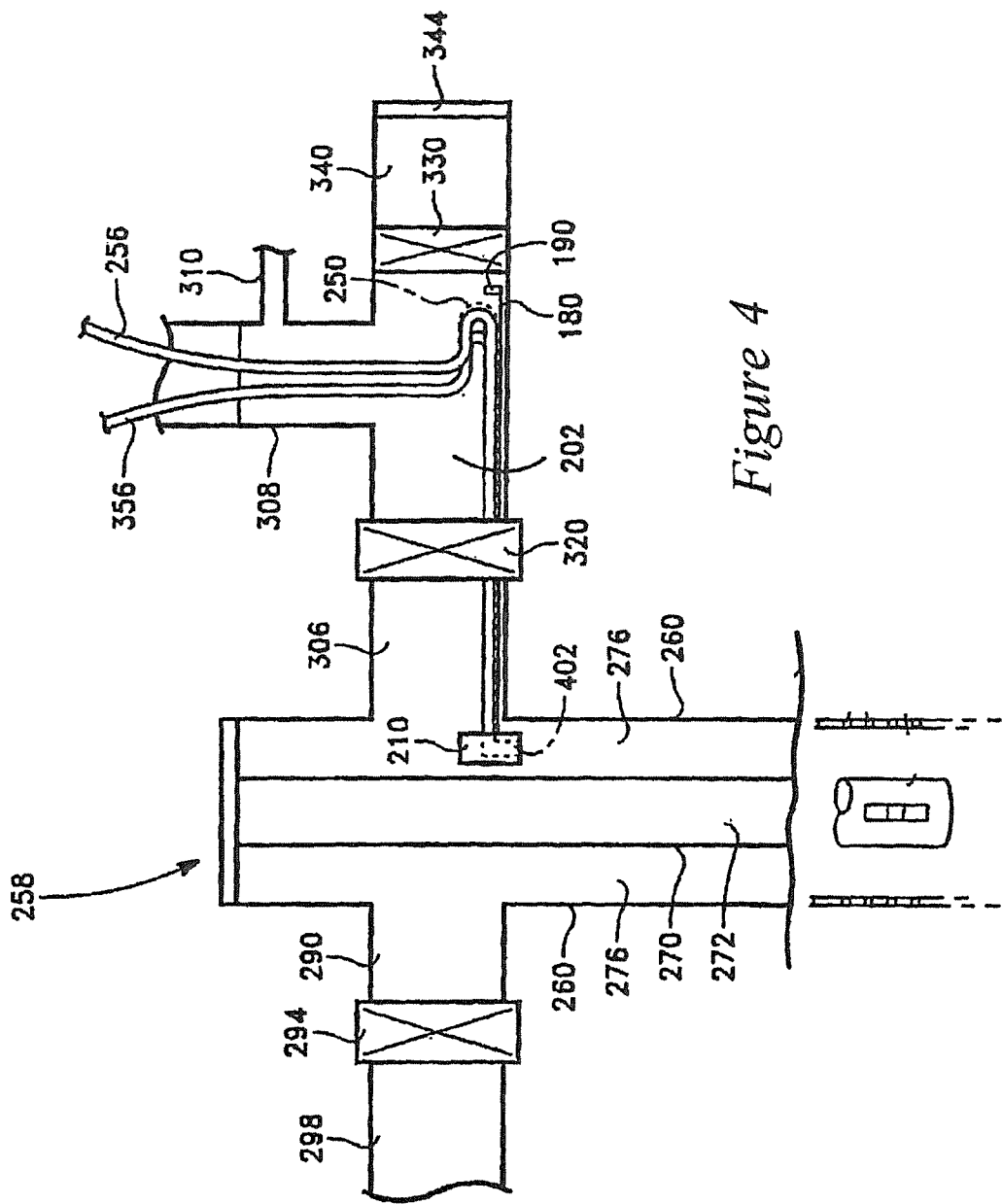
FIG. 4 schematically shows a wellhead installation showing the positioning of the shock wave emission tubing and signal receiving tubing within the casing-tubing annulus of a well.

FIG. 4 schematically depicts an embodiment of a fluid level determination apparatus having signal emitting and receiving components which may be inserted and retracted from the pressure confining portions of wellhead 258. In this embodiment the components of the apparatus which emit the pressure wave and which receive the reflected pressure wave may be placed in position within the tubing-casing annulus by opening a valve and manipulating the signal emitting and receiving components into position, maintaining pressure control of the well at all times.

As illustrated in FIG. 4, wellhead 258 provides a means of controlling flow from the well, which is lined with casing 260, which is typically but not necessarily landed within the wellhead as understood by those knowledgeable in the art. Suspended from wellhead 258 is a tubing string 270 through which reservoir fluids are produced to the surface. In wells with insufficient reservoir pressure to flow to the surface, oil and associated fluids are primarily produced by artificial lift mechanisms through the interior 272 of tubing string 270. In oil wells, gas which breaks out of solution within the wellbore is typically produced within the tubing-casing annulus 276.

Figure 19:
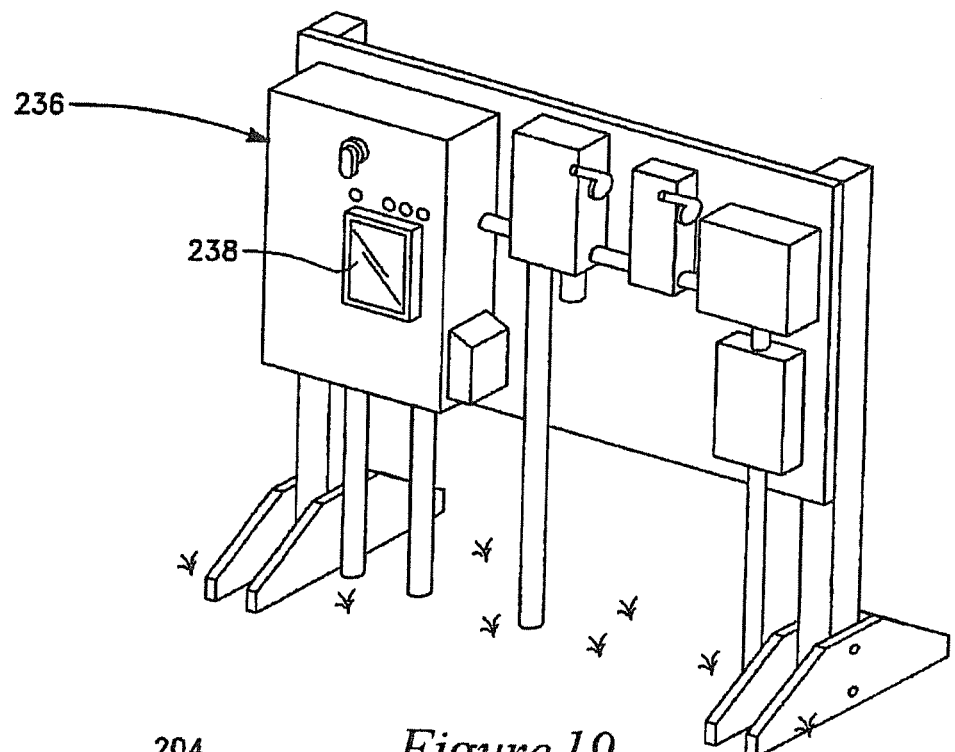
FIG. 19 shows motor controls which may be utilized in embodiments of the invention.
Figure 20:
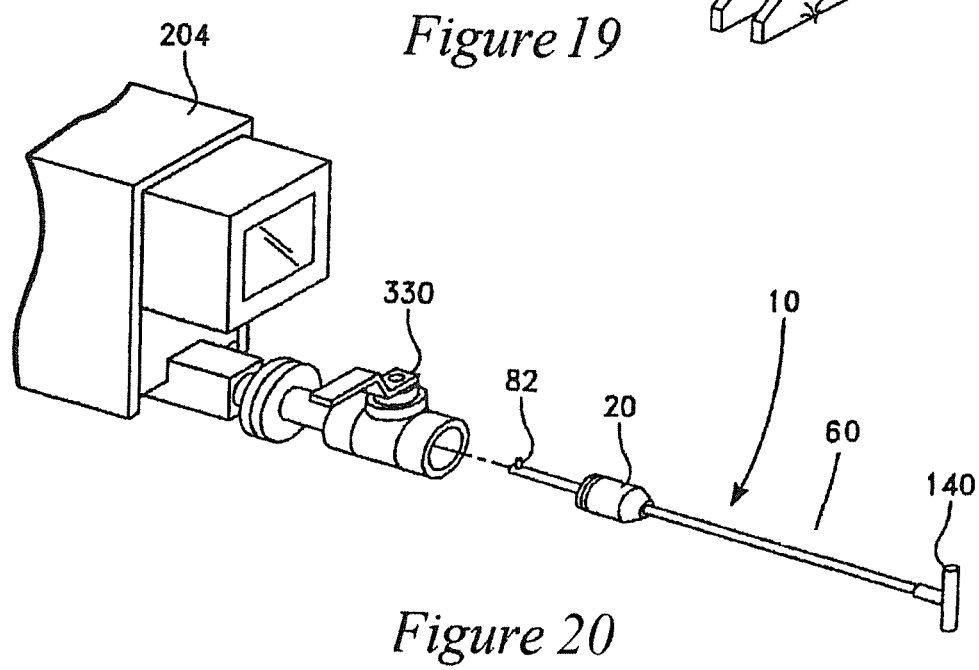
FIG. 20 shows the insertion of an installment tool into an embodiment of the apparatus.
Figure 21:
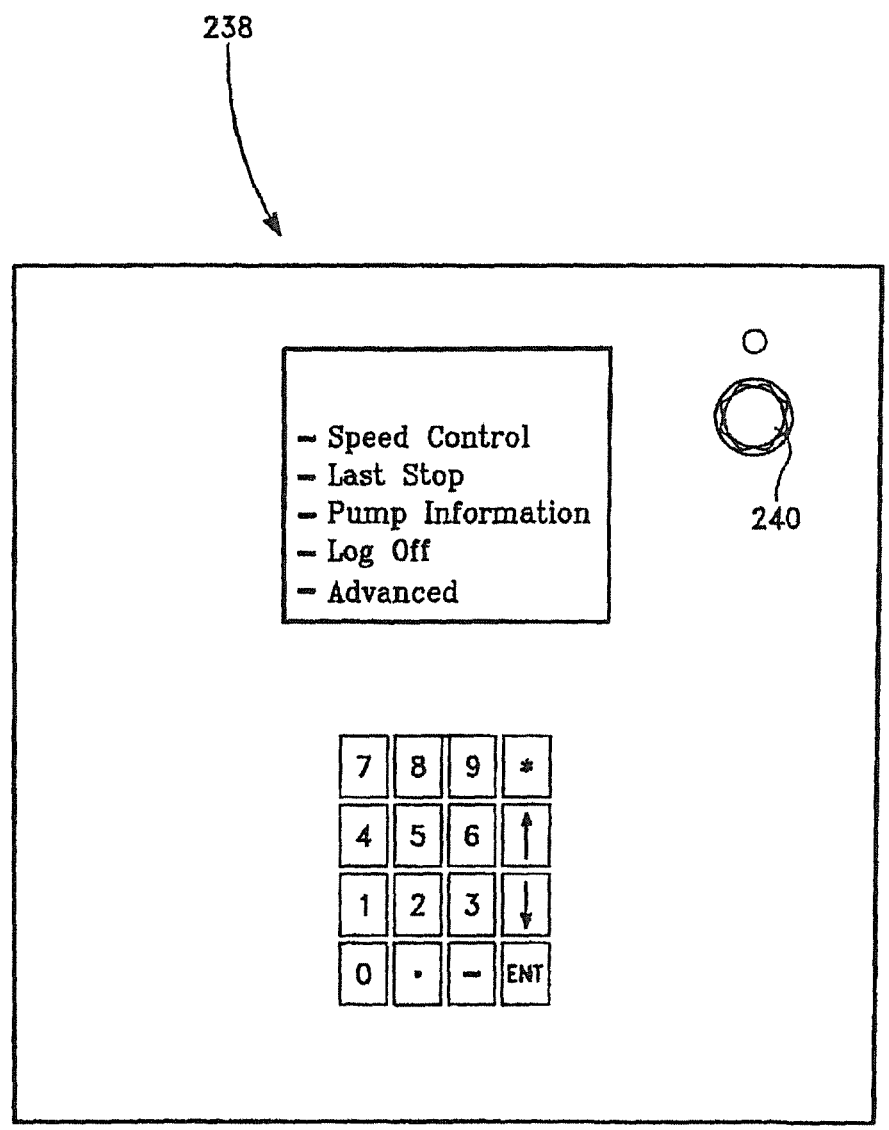
FIG. 21 shows a user interface for control of a variable frequency drive unit utilized with the present invention.

An insertion tool 10 as depicted in FIG. 19 may be utilized for inserting and retracting a carrier tray 180 such that the tubing guide 210 may be disposed adjacent or into the tubing-casing annulus 276 while continuing to maintain pressure control of the well. As discussed in greater detail below, various components of the fluid level determination mechanism may be initially set within a carrier tray 180 which slides within a housing 202. Housing 202 is made up to second outlet 306 of the wellhead 258. The carrier tray 180 and housing 202 may be attached as a unit to the second outlet 306 and the carrier tray manipulated forward from its stored position in the housing into an operating position within the wellhead by pushing the tray forward with the insertion tool 10. Likewise, when it is desired to retract the carrier tray 180 completely into the housing 202, the insertion tool 10 is re-inserted and its tip 82 locks on to a portion of the carrier tray. The insertion tool 10 is retracted, pulling the carrier tray 180 back into the housing 202.

Referring now to FIGS. 5-7, the inside facing end of carrier tray 180 is described. A tubing guide 210 is disposed at the inside facing end of the carrier tray 180, which is the end opposite from receiving piece 190. A first channel 224 and a second channel 226 extend through tubing guide 210. First channel 224 and second channel 226 are aligned along the long axis of the carrier tray 180. The inside facing end of the carrier tray 180 further comprises an opening 232, through which gas injection port 382 and pressure wave receiving port 402 are disposed. When carrier tray 180 is placed within an operating position in wellhead 258 gas injection port 382 and pressure wave receiving port 402 will be positioned in the tubing-casing annulus 276, each which may have an opening positioned in a downhole facing orientation.

Figure 8:
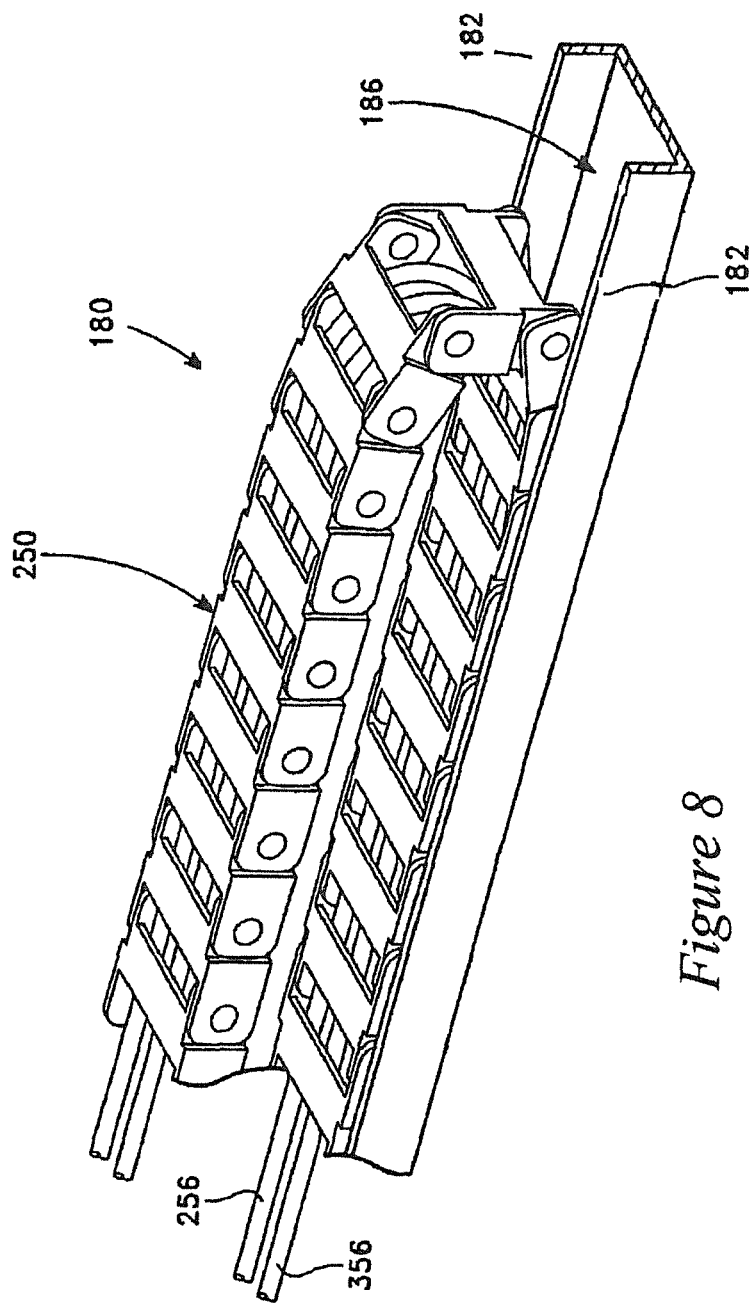
FIG. 8 shows a detailed view of an optional tray assembly which may be utilized for disposing the shock wave emission tubing and signal receiving tubing within a wellhead assembly.

FIG. 8 provides a perspective view of a portion of an embodiment of carrier tray 180 showing portions of gas emitting tubing 256 and signal receiving tubing 356 disposed within a carrier member 250. Carrier member 250 is configured to fit within a channel 186 of carrier tray 180. The carrier member 250 permits gas injection port 382 at the terminus of gas emitting tubing 256 and pressure wave receiving port 402 at the terminus of signal receiving tubing 356 to be positioned within the wellhead 258 in the proper orientation with respect to the tubing-casing annulus 276, while the opposite ends of the gas emitting tubing 256 and the signal receiving tubing 356 may be connected to components as schematically depicted in FIG. 4. It is to be appreciated that carrier member 250 comprises a plurality of linked components which are flexible and the position indicated within FIG. 8 is one possible positioning of the carrier member. Gas emitting tubing 256 and signal receiving tubing 356 are likewise flexible and may be flexed in a manner corresponding with that of carrier member 250, while the carrier member guides and protects the gas emitting tubing and the signal receiving tubing as the carrier tray 180 is shifted within housing 202 and wellhead 258.

Figure 16:
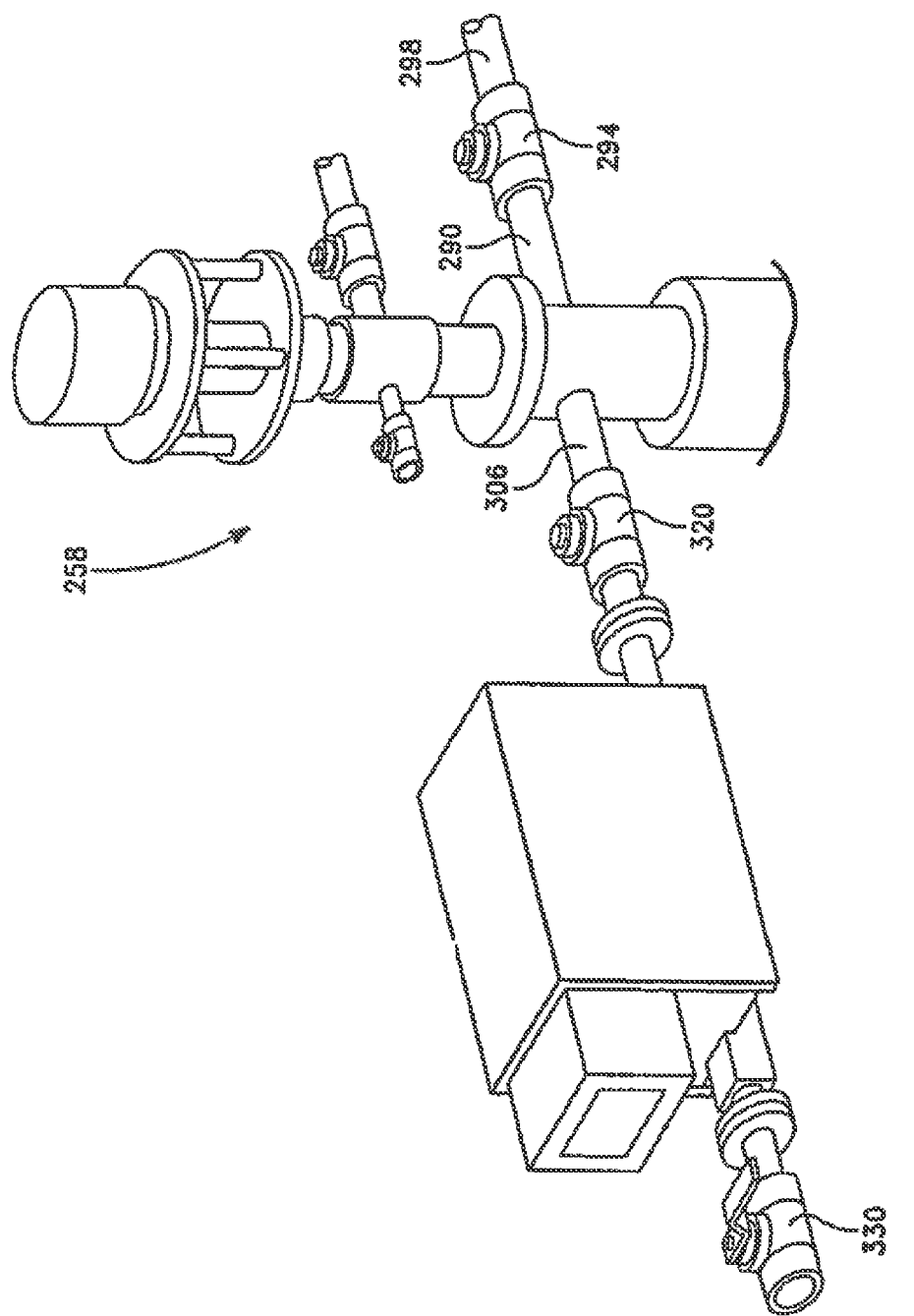
FIG. 16 shows the opposite side of the fluid level determination apparatus shown in FIG. 15.
Figure 17:
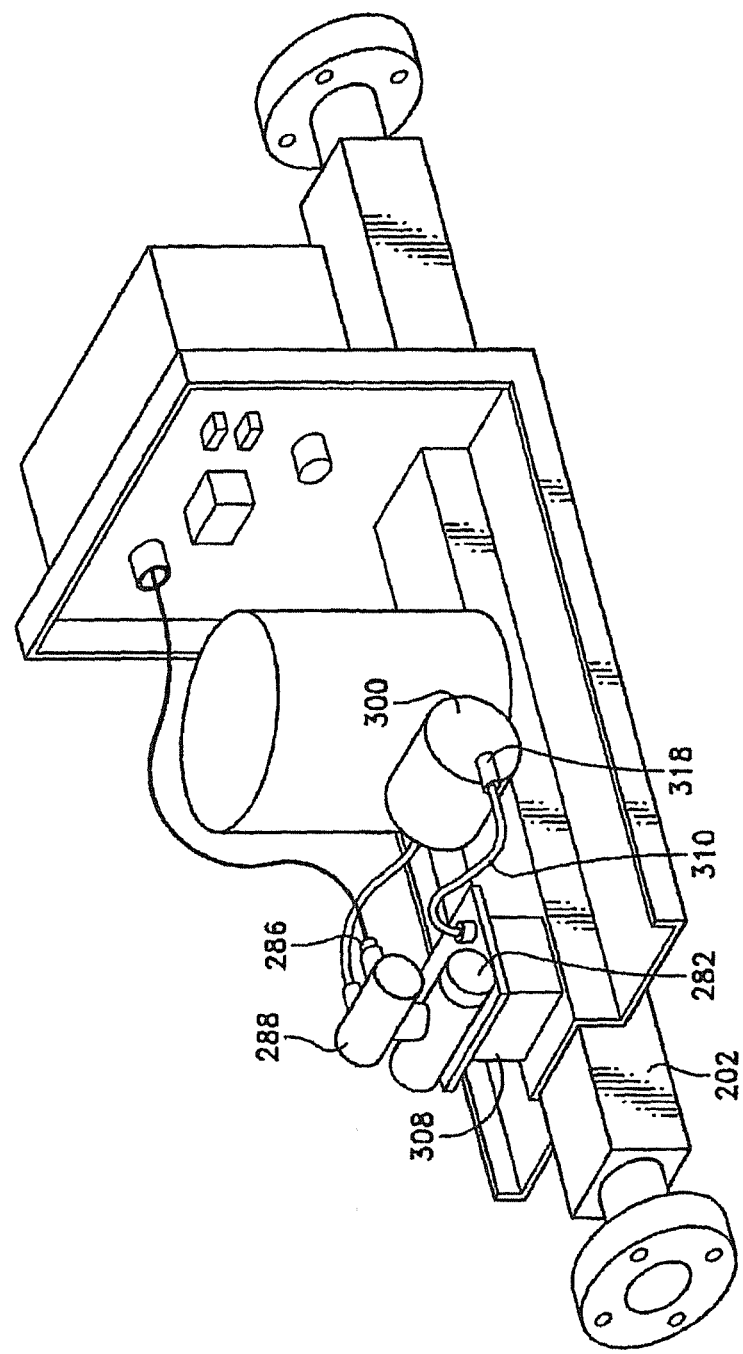
FIG. 17 shows the fluid level determination apparatus shown in FIG. 16 with the exterior cover removed.
Figure 18:
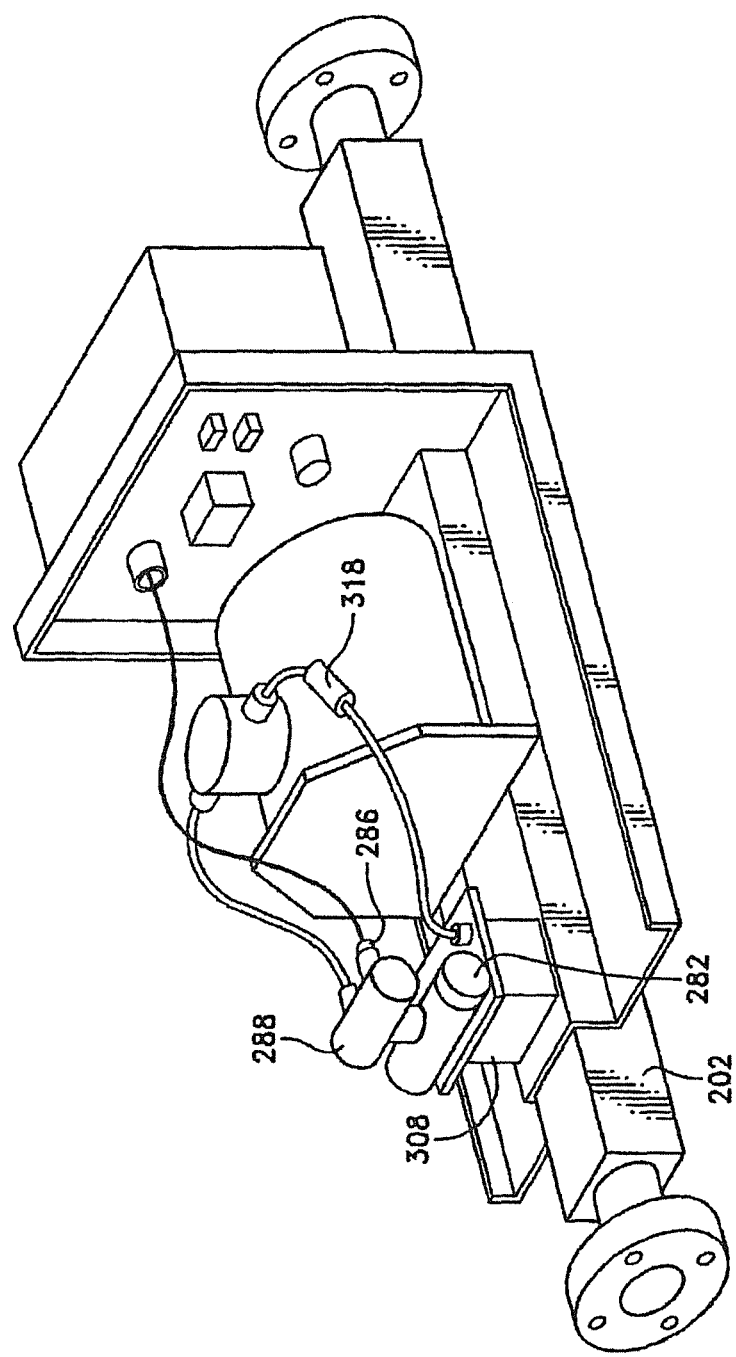
FIG. 18 shows an alternative embodiment of the fluid level determination apparatus with the exterior cover removed.

FIG. 9 schematically depicts the configuration of the gas emitting tubing 256 and signal receiving tubing 356 which are disposed within take-off conduit 308, which is attached to housing 202, which in turn is attached to wellhead 258. FIG. 9 schematically shows how gas emitting tubing 256 and the signal receiving tubing 356 are connected to the external components of the fluid level measuring apparatus. The gas emitting tubing 256 is connected to compressor valve 282 which is connected to pressure transducer 286 by a conduit 284 or via flow channels through the various components, such as tank 288 depicted in FIG. 16. Pressure transducer 286 controls the pressure of a sample of gas to be injected into well annulus 276 through gas emitting tubing 256. The pressure transducer 286 is in fluid communication with a compressor 300 or with a pressurized source of gas, such as bottled nitrogen. When compressor 300 is utilized, the system may utilize produced gas from the well as described below.

The relationship of an embodiment of the invention with wellhead 258 is schematically shown in FIG. 4. A first outlet 290 may extend from one side of the wellhead 258, with a valve 294 attached to provide access to annulus 276 for receiving production from the well or for introducing fluids into the annulus, such as kill fluid. Valve 294 is connected to production line 298 which may transport produced fluids to a desired facility, such as a metering station, gas separator, tank farm or pipeline.

Typically located on the opposite side of the wellhead 258 from first outlet 290 is second outlet 306. Takeoff conduit 308, a component of the present invention, is attached to second outlet 306, wherein the takeoff conduit 308 may receive produced casing gas from annulus 276. A produced gas line 310 extends from the takeoff conduit 308. As schematically shown in FIG. 9, filter apparatus 318 may be utilized to filter produced casing gas received from produced gas line 310. Filter apparatus 318, which may be an inline filter, removes debris from the produced casing gas which would otherwise pass into compressor 300. Compressor 300 may be used to compress produced casing gas which flows from annulus 276. While FIG. 9 schematically shows the produced casing gas flowing through takeoff conduit 308, it is to be appreciated that alternative piping configurations may be utilized as known by those skilled in the art of the invention. FIGS. 13-17 provide perspective views of many of the components schematically depicted in FIGS. 4 and 9.

Block valve 320 is typically attached to second outlet 306 to control flow from the annulus 276, including regulating gas flow into takeoff conduit 308, and also allowing the well to be closed in. Block valve 320 is configure to permit insertion of the other components of the invention such as carrier tray 180, and portions of gas emitting tubing 256 and signal receiving tubing 356 which may be disposed within carrier member 250. These components may be urged into a forward position by insertion tool shaft 60 such that gas injection port 382 at the terminus of gas emitting tubing 256 and pressure wave receiving port 402 at the terminus of signal receiving tubing 356 are positioned adjacent to annulus 276. The gas injection port 382 and pressure wave receiving port 402 may be placed in a downward facing orientation in annulus 276.

In the embodiment of the invention utilizing the retractable components, the gas emitting tubing 256 passes through first channel 224 in tubing guide 210, disposed at the end of the carrier tray 180, and into opening 232. Compressed gas from the gas emitting tubing 256 may exit from gas injection port 382 into the well annulus 276 Likewise, signal receiving tubing 356 extends through one of the openings in tubing guide 210 such that a pressure wave (which may transport produced gas) is received through pressure wave receiving port 402 and flows through signal receiving tubing 356, which is in fluid communication with a pressure sensor 500.

Figure 12:
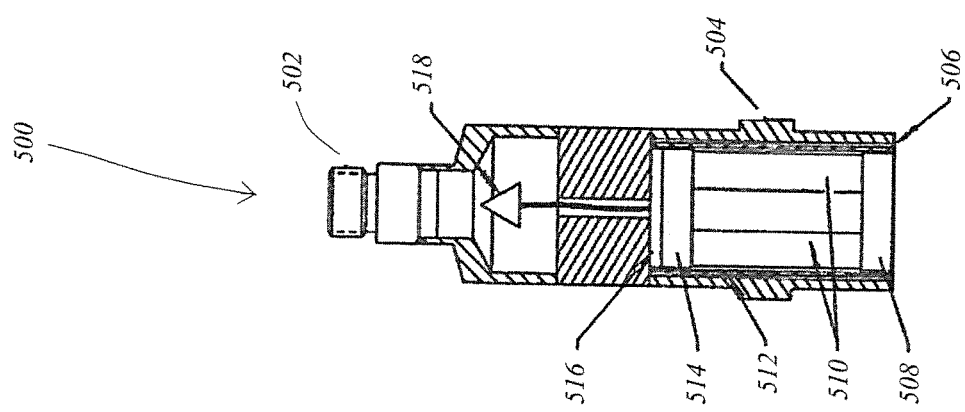
FIG. 12 shows the components of a pressure sensor which may be utilized in embodiments of the present invention.

Pressure sensor 500 is shown in detail in FIG. 12. The anticipated environment for application of the present invention will potentially have large mechanical vibrations and electromagnetic interference due to the various components of the artificial lift system. Such vibrations and electrical noise can significantly increase the noise in the measured reflected pressure signal. To eliminate these noise factors and improve the detection accuracy of the system, the pressure sensor 500 should compensate for mechanical vibrations and shield against electromagnetic interference. Thus, pressure sensor 500 is a high-sensitivity pressure sensor which is vibration-compensated with an electrical amplifier integrated directly into the sensor body. As shown in FIG. 12, pressure sensor 500 comprises a connector 502, housing 504, a diaphragm 506, an end piece 508, piezoelectical crystal sensors 510, a preload sleeve 512, a mass 514, an acceleration compensation crystal 516, and an integrated circuit amplifier 518. The internal acceleration compensation crystal 516 attached to the known mass 514 detect lateral motion and strain in the sensor 500. This lateral motion is caused by low-frequency mechanical vibration of the sensor body and not the incoming pressure waves. This lateral motion is subtracted from the pressure sensor signal generated by piezoelectrical crystal sensors 510 which are oriented to receive incoming pressure waves incident on diaphragm 506.

In addition, the vibration-compensated pressure signals are amplified through integrated circuit amplifier 518. The close proximity of the amplifier circuit 518 to the piezoelectical crystal sensors 510 ensures that minimal electrical noise is introduced between the sensors and the amplifier. Furthermore, because the amplifier 518 is housed within the metal body of the pressure sensor 500, the sensor housing 504 acts as a Faraday cage that shields the sensitive amplifier 518 from extraneous electromagnetic signals. These features of pressure sensor 500 produce sensed pressure measurement with a high signal to noise ratio.

The inventors herein have determined that an integrated circuit piezoelectric pressure sensor, Model No. 106B52 available from PCB Piezotronics, Inc., is an acceptable pressure sensor 500 for application with the present invention. This pressure sensor 500 is acceleration compensated, wherein extra acceleration sensing crystals are integrated into the pressure sensor to detect whole-body vibration of the sensor. This detected vibration is then subtracted from the sensor's output. By doing this, shaking and vibration caused by production equipment does not affect the sensor's output. This sensor also provides a significantly higher signal-to-noise ratio than the sensors presently in use for fluid level determinations.

As discussed above, the gas injection port 382 and the pressure wave receiving port 402 may be positioned in the wellhead such that they are facing downward into annulus 276 between casing 260 and tubing 270. The advantage of having the gas injection port 382 and the pressure wave receiving port 402 aimed directly downhole is to minimize any noise, disturbance or impeded flow which would otherwise occur by injecting the gas from any other location. This is in contrast to many surface fluid level measurement devices which make up to externally located valves on the wellhead.

As part of the presently disclosed method of using the disclosed apparatus, the inventors herein have developed what they refer to as dual-pulse echo reflectometery (or D-PER). The D-PER method comprises sending two pressure pulses, separated by 100 msec, down a well instead of the single pulse as currently practiced, thus creating a distinctive signature to the induced pressure wave. With the D-PER method, a reflection from a fluid surface shows up as a double spike in the detected signal. This reflected signal is much easier to separate from noise in the well, thereby allowing fluid level determinations at greater depths as well as handling the inherent background noise of the well such as gas upflow and acoustic noise generated by the production equipment. For example, with the known devices, a bubble of gas "burped" by the well appears as a fluid surface. However, with the D-PER method, the gas bubble would have to occur as a double "burp," the two emissions separated by exactly 100 msec, to be interpreted as a fluid level. In other words, in the D-PER method the induced signal has a distinctive signature which is detected in the reflected wave form returned to the surface. One acceptable mechanical configuration for applying the D-PER method would be to utilize a second tank 288 charged by a compressor 300, where a second pressure transducer 286 operates a second compressor valve 282, which is programmed to open exactly 100 msec after the first compressor valve 282 opens, thereby providing the nearly instantaneous second charge of gas into gas emitting tubing 256.

As schematically depicted in FIG. 4, an additional block valve 330 is located at the opposite end of the takeoff conduit 308. An additional piping segment 340 may be attached to block valve 330, where the piping segment has a threads 344, which may have a standard well cap attached (not shown).

Figure 13:
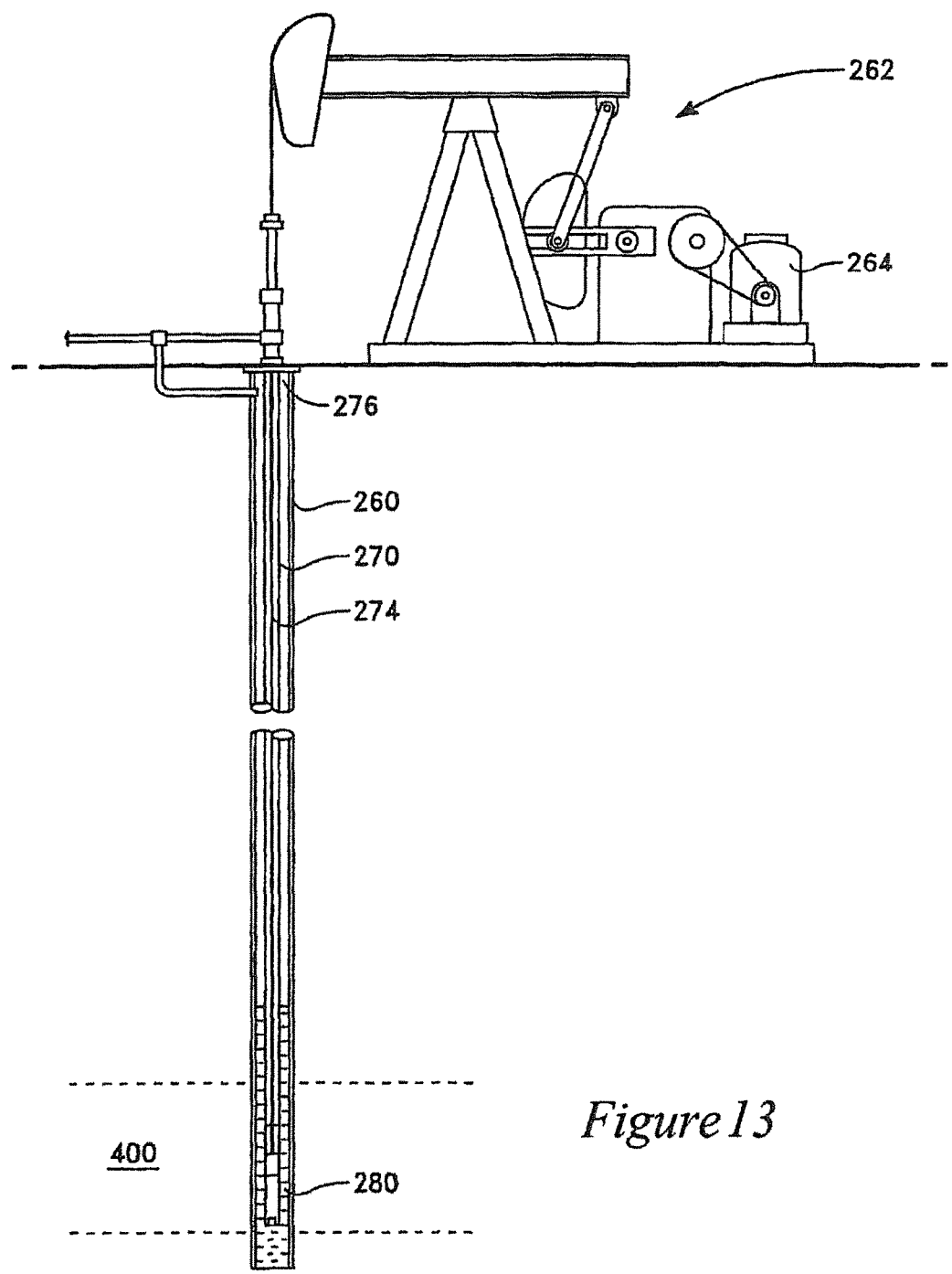
FIG. 13 schematically shows one form of artificial lift system which utilizes a surface pumping unit to operate a subsurface pump using reciprocation of a sucker rod string within a tubing string.

As schematically shown in FIG. 13, a subsurface pump 280 may be utilized to artificially lift reservoir fluids produced from reservoir 400. The subsurface pump 280 may be actuated by a rod string 274 which is disposed within tubing 270. The rod string 274 may operate subsurface pump 280 by reciprocation. When operated by reciprocation, the rod string 274 is connected to a pump plunger and actuates the plunger upwardly and downwardly by the action of a surface pumping unit 262, such as that depicted in FIG. 12, and pumps fluid into tubing 270. Alternatively, the rod string 274 may be rotated by a surface unit such as that shown in FIG. 14 thereby actuating a progressive cavity pump 278 by rotating a rotor within a stator. Other forms of artificial lift equipment may be utilized with the fluid level determination apparatus, including submersible pumps, hydraulic pumps and jet pumps. It is to be appreciated that because these artificial lift methods utilize a rod string 274 which is either reciprocating or rotating within the tubing 270, there can be significant background noise. However, the presently disclosed apparatus is capable of accurately determining the fluid level in the well despite the presence of this background noise.

Moreover, because mechanical failures in the artificial lift system will generate different background noise, for example, an installation in which the pump plunger is "pounding" fluid will generate background noise different from a pump plunger which encounters a full barrel of fluid, or, as another example, an installation in which the subsurface pump is gas locked will produce a different sound than a normal producing pump. In addition, fluid flow through holes in casing, which holes may result from corrosion damage or mechanically induced damage, will generate noise. Thus, the presently disclosed system, by recording and comparing relative signal-to-noise ratios, may be utilized as a diagnostic tool for the mechanical condition of the well.

The carrier member 250 carries and protects the length of the emission tubing 256 as it extends from the compressor valve 282 on one end to the other end attached to the gas injection port 382 Likewise, the carrier member protects the length of the signal receiving tubing 356 as it extends from pressure sensor 500 to the pressure wave receiving port 402. As suggested by the Figures, emission tubing 256 and signal receiving tubing 356 must be sufficiently flexible to be manipulated forward such that the portion of the carrier tray 180 having gas injection port 382 and pressure wave receiving port 402 may pass through the opened block valve 320 and be positioned within wellhead 258 with the gas injection port and pressure wave receiving port oriented to be facing downwardly within annulus 276.

After being inserted through the block valve 330, the insertion tool shaft 60 is attached to the carrier tray 180 by passing through first channel 194 and making contact with the back wall of receiving piece 190. The insertion tool shaft 60 is then rotated 90 degrees such that projection 82 locks into receiving piece 190, which will have a channel for receiving the projection. Once the insertion shaft has locked onto the carrier tray 180, the insertion tool shaft 60 may be used to urge the carrier tray forward to correctly position the gas injection port 382 and pressure wave receiving port 402 as discussed above.

The insertion tool shaft 60 may then be disengaged by rotating the insertion tool shaft to disengage projection 82 from receiving piece 190. Once disengaged from carrier tray 180, insertion tool shaft 60 may be withdrawn block valve 330 until the end with project 82 is inside bell 20 allowing the closing of block valve 330. Bell 20 may then be unscrewed from the threads 344 of additional pipe segment 340. The insertion tool 10 may be utilized for several wells rather than having a single insertion tool 10 permanently connected to each well. For the servicing or removal of the components, the entire operation may be reversed. That is, the insertion tool 10 is connected to additional pipe segment 340 of a wellhead 258 and the block valve 330 is opened. The insertion tool shaft 60 is then engaged to the receiving piece 190 and the carrier member 180 is then drawn in the direction of the additional pipe segment 340 such that the carrier member 180 clears block valve 320 and the block valve is closed. The insertion tool may further comprise detachable handle 140, which is attached to one end of shaft 60. Shaft 60 comprises a projection 82 which releasably attaches to releasing piece 190 at the end of carrier tray 180.

Balancing Reservoir Inflow with the Outflow of the Artificial Lift Equipment

The apparatus described above provides a reliable and relatively inexpensive means of acquiring real time fluid level information for a particular well 602. When a number of wells 602, 604, 606, 608 producing from a single reservoir 400 are equipped with the apparatus, key information for reservoir management becomes available. This information allows reservoir engineers to make informed decisions regarding, among other things, pressure maintenance utilizing injection wells 610, infill well requirements, isolation of water zones, and target zones for increased injection. This information is also helpful to production engineers, allowing them, among other things, to properly size artificial lift equipment for a particular well, producing zone, or field and to optimize the production facilities according to the demands of the fluid output from the wells. One means of optimizing the artificial lift equipment is by utilizing motor control means on the electric motor 264 utilized as a prime mover to operate the subsurface pump or used to operate injection pumps.

In a relatively simple application of motor control means, the motor 264 operating the subsurface pump can be stopped and started according to the observed real time fluid level. More complicated applications control the speed of the motor 264 so that the outflow capacity of the artificial lift equipment is in dynamic equilibrium with the observed reservoir inflow. In most situations, the desired equilibrium will occur when the fluid level is maintained at a relatively small distance above the subsurface pump 278, 280. The optimal fluid level above the subsurface pump 278, 280 will exert minimal back pressure against the face of the producing reservoir to increase the inflow of reservoir fluids, but at a level which is sufficiently high to prevent gas locking of the pump or fluid pound.

Figure 14:
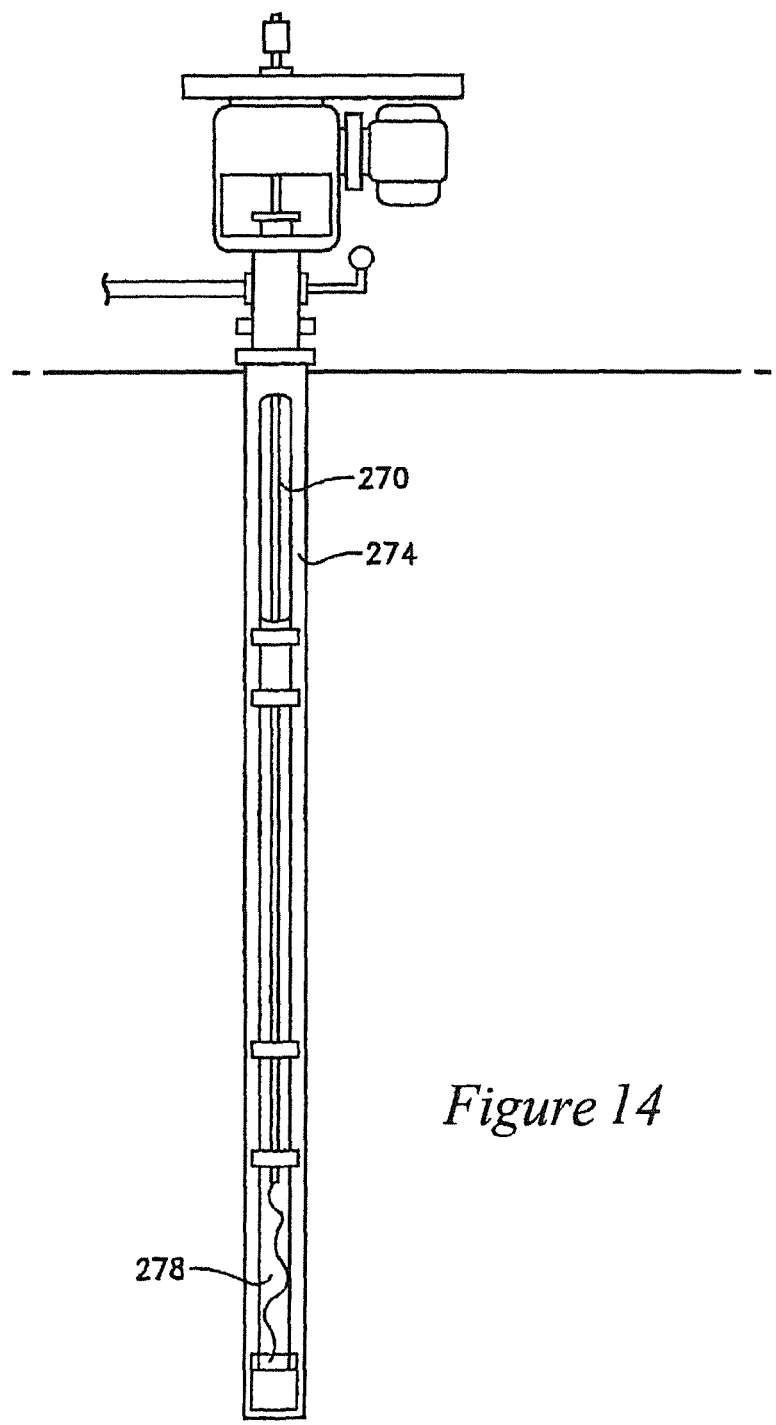
FIG. 14 schematically shows another form of artificial lift system which utilizes a surface unit to operate a progressive cavity pump using rotation of a sucker rod string within a tubing string.
Figure 15:
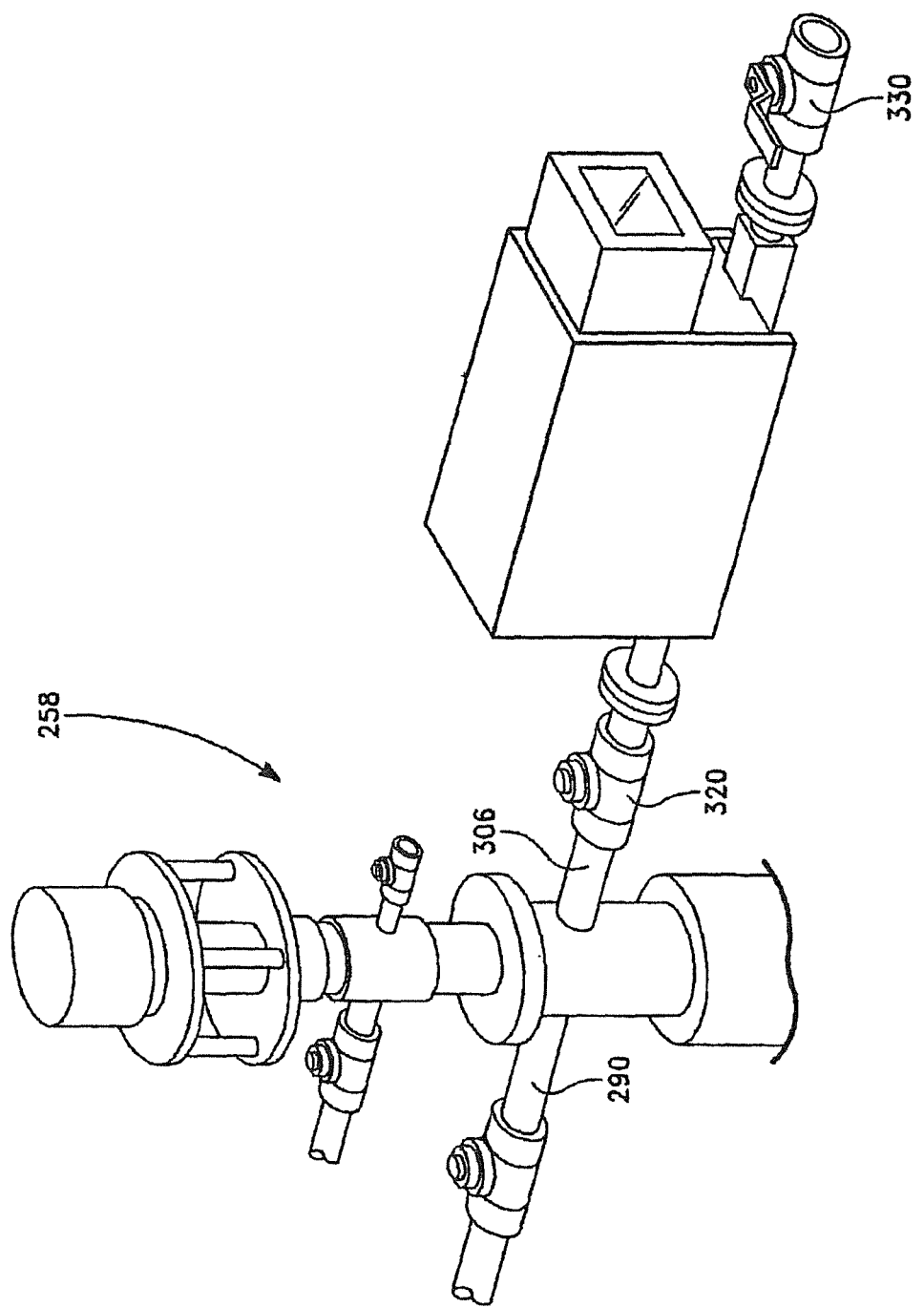
FIG. 15 shows an embodiment of the fluid level determination apparatus mounted to a wellhead.

For electrical motors, the most common method of controlling the speed of the motor is with a variable frequency drive unit ("VFD") 236, an example of which is shown in FIG. 19 as mounted as part of the motor controls for electric motor 264. On a rod pumped unit 286, such as that shown in FIG. 13, VFD 236 allows an operator to specify the exact speed for the motor to run, which typically ranges from 1200 RPM down to 240 RPM. The VFD 236 provides a number of known advantages to manually controlling the speed of the pumping unit 262 by stopping and starting the pumping unit or by changing the motor sheave size, which both require substantial dedications of manpower. Both manual control and time clock control require the pumping unit to be stopped, often for long periods of time, which can result in sand flow into the wellbore, and mechanical stresses when the unit is restarted. In contrast, the VFD 236 allows the pumping unit 262 to be run continuously which reduces mechanical stress on the pumping unit gearbox, rods, belts, etc. Slowing the speed of the pumping unit 262 reduces power consumption and demand factor. Similar advantages are present for using a VFD 236 with a progressive cavity pump system as depicted in FIG. 14.

However, the combination of real time fluid level determination with the speed control of a VFD 236 provides even greater advantages. The presently disclosed system combines the real time determination of the fluid level with means of near instantaneous control of the outflow of the artificial lift system, allowing the operator, by input into a control panel, to specify the desired fluid level to be maintained in a particular well. Data provided from the above described real time fluid level determination apparatus is provided to a processor controlling the VFD 236. The sampling rate of the real time fluid level determination apparatus may be adjusted to provide fluid level determinations as frequently as every twenty seconds.

The fluid level determinations may be provided to a processor controlling the VFD 236. As result, the inflow and outflow performance of the well can be optimized for producing the well at a flow rate which is efficient, reduces wear in the artificial lift system, and which may be coordinated on a field wide basis with other artificial lift units for effective reservoir management.

The VFD may have a user interface 238 which allows the user to input a desired fluid level or to set the unit for a desired production rate. The user interface 238 may further comprise a rheostat control 240 which allows the operator to make immediate changes to the pumping speed in accord with the observed conditions. The user interface 238 may also be utilized to provide various reservoir management tools, such as historical analysis of fluid levels and production rates.

Figure 22:
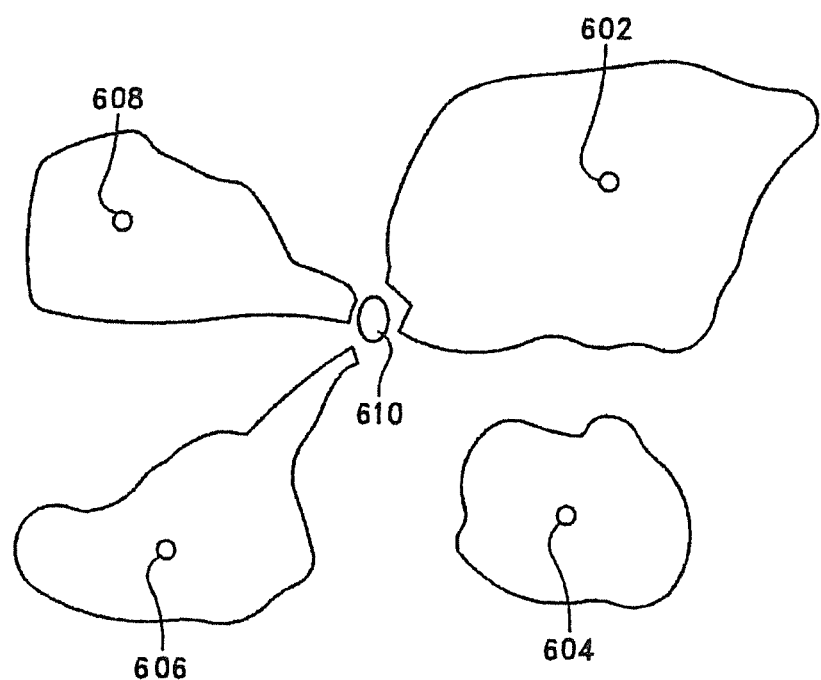
FIG. 22 schematically shows a plan view of a portion of an oil field which may utilize embodiments of the disclosed system for reservoir management.

When employed on a field wide basis, such as depicted in the example provided in FIG. 22, the data may be utilized to ascertain, among other things, the effectiveness of well stimulation programs, pressure maintenance activities, and well spacing practices. When analyzed together with well maintenance records, the information may also be utilized for analyzing preventative maintenance, scheduling pump changes, and well diagnostics.

While the above is a description of various embodiments of the present invention, further modifications may be employed without departing from the spirit and scope of the present invention. Thus the scope of the invention should not be limited according to these factors, but according to the following appended claims.

What is claimed is:

1. A method for determining the depth to a top surface of a column of fluid within a well, the well comprising a wellhead, a string of casing and a string of tubing concentrically disposed within the string of casing where an annulus is defined between the tubing and the string of casing, the method comprising:

releasing a first charge of compressed gas into the annulus thereby creating a first shock wave, releasing a second charge of compressed gas into the annulus separated by a time period of half a second or less after the releasing of the first charge of compressed gas thereby creating a second shock wave;

receiving a first reflected signal from the first shock wave with a piezoelectric differential pressure sensor, the piezoelectric differential pressure sensor having a first acceleration sensing crystal and a second acceleration sensing crystal contained in a body, where the first acceleration sensing crystal detects the reflection of the first shock wave and the second acceleration sensing crystal detects a vibration in the body to produce a first output signal;

receiving a second reflected signal from the shock wave with the piezo differential pressure sensor, where the first acceleration sensing crystal detects the reflection of the second shock wave and the second acceleration sensing crystal detects the vibration in the body to produce a second output signal; and processing the first output signal and the second output signal to determine the depth to the top surface of the column of fluid within the string of casing of the well.

* * * * *